(12) United States Patent
Wilson et al.

(10) Patent No.: US 9,710,272 B2
(45) Date of Patent: Jul. 18, 2017

(54) COMPUTER PROCESSOR WITH GENERATION RENAMING

(71) Applicant: Avago Technologies General IP (Singapore) PTE. Ltd, Singapore (SG)

(72) Inventors: Sophie Wilson, Lode Cambridge (GB); John Redford, Cambridge (GB); Geoffrey Barrett, Bristol (GB); Tariq Kurd, Bishopton (GB)

(73) Assignee: Avago Technologies General IP (Singapore) Pte. Ltd.

( * ) Notice: Subject to any disclaimer, the term of this patent is extended or adjusted under 35 U.S.C. 154(b) by 404 days.

(21) Appl. No.: 14/530,370

(22) Filed: Oct. 31, 2014

(65) Prior Publication Data

US 2015/0309797 A1 Oct. 29, 2015

Related U.S. Application Data

(60) Provisional application No. 61/984,709, filed on Apr. 25, 2014, provisional application No. 61/984,708, filed on Apr. 25, 2014, provisional application No. 61/984,707, filed on Apr. 25, 2014, provisional application No. 61/984,706, filed on Apr. 25, 2014, provisional application No. 61/984,710, filed on Apr. 25, 2014, provisional application No. 61/984,711, filed on Apr. 25, 2014.

(51) Int. Cl.
*G06F 9/30* (2006.01)
*G06F 9/38* (2006.01)

(52) U.S. Cl.
CPC ........ *G06F 9/30098* (2013.01); *G06F 9/3013* (2013.01); *G06F 9/30043* (2013.01); *G06F 9/30058* (2013.01); *G06F 9/30065* (2013.01); *G06F 9/30145* (2013.01); *G06F 9/384* (2013.01); *G06F 9/3826* (2013.01); *G06F 9/3832* (2013.01); *G06F 9/3834* (2013.01); *G06F 9/3836* (2013.01); *G06F 9/3842* (2013.01); *G06F 9/3848* (2013.01); *G06F 9/3857* (2013.01)

(58) Field of Classification Search
None
See application file for complete search history.

(56) References Cited

U.S. PATENT DOCUMENTS

| 5,625,788 A * | 4/1997 | Boggs ................ G06F 9/3836 712/214 |
| 5,881,262 A | 3/1999 | Abramson et al. |

(Continued)

FOREIGN PATENT DOCUMENTS

CN 1114763 A 1/1996

*Primary Examiner* — William B Partridge
(74) *Attorney, Agent, or Firm* — Sterne, Kessler, Goldstein & Fox P.L.L.C.

(57) ABSTRACT

A processor including a register file having a plurality of registers, and configured for out-of-order instruction execution, further includes a renamer unit that produces generation numbers that are associated with register file addresses to provide a renamed version of a register that is temporally offset from an existing version of that register rather than assigning a non-programmer-visible physical register as the renamed register. The processor includes a small reset DHL Gshare branch prediction unit coupled to an instruction cache and configured to provide speculative addresses to the instruction cache.

20 Claims, 18 Drawing Sheets

(56) References Cited

U.S. PATENT DOCUMENTS

| | | | |
|---|---|---|---|
| 5,996,063 A | 11/1999 | Gaertner et al. | |
| 6,240,509 B1 | 5/2001 | Akkary | |
| 6,370,637 B1 | 4/2002 | Meier et al. | |
| 7,043,626 B1 * | 5/2006 | McMinn | G06F 9/3842 712/216 |
| 2012/0110594 A1 * | 5/2012 | Talpes | G06F 9/505 718/105 |
| 2014/0052730 A1 * | 2/2014 | Harris | G06F 17/30067 707/740 |

* cited by examiner

| | IC1 | DE1 | DE2 | RS1 | RS2 | EX1 |
|---|---|---|---|---|---|---|
| 0 | ZLOOP | | | | | |
| 1 | INST 1<br>Loop Count = -1 | ZLOOP<br>(Set loopstart, loopmatch, & loopcount registers) | | | | |
| 2 | INST 2<br>Loop Count = -1 | INST 1 | ZLOOP (SIN #0)<br>Generate SIN #1 | | | |
| 3 | Loopmatch Inst 3<br>Loop Count = -1 | INST 2 | INST 1<br>(SIN #1) | ZLOOP<br>(SIN #0) | | |
| 4 | INST 1<br>Loop Count = -2 | Loopmatch INST 3<br>(Generate synthethic branch instruction) | INST 2<br>(SIN #1) | INST 1<br>(SIN #1) | ZLOOP<br>(SIN #0) | |
| 5 | INST 2<br>Loop Count = (Loop Count + R₀) = (-2 + 10) = 8 | INST 1 | Loopmatch INST 3<br>(SIN #1)<br>(Generate SIN #2) | INST 2<br>(SIN #1) | INST 1<br>(SIN #1) | ZLOOP<br>(SIN #0) |
| 6 | Loopmatch Inst 3<br>Loop Count = 8 | INST 2 | INST 1<br>(SIN #2) | Loopmatch INST 3<br>(SIN #1) | INST 2<br>(SIN #1) | INST 1<br>(SIN #1) |
| 7 | INST 1<br>Loop Count = 7 | Loopmatch INST 3 | INST 2<br>(SIN #2) | INST 1<br>(SIN #2) | Loopmatch INST 3<br>(SIN #1) | INST 2<br>(SIN #1) |
| 8 | INST 2<br>Loop count = 7 | INST 1 | Loopmatch INST 3<br>(no more SIN generation) | INST 2<br>(SIN #2) | INST 1<br>(SIN #2) | Loopmatch INST3<br>(SIN #1) |

FIG. 18 the accompanying drawings. In the drawings, like reference numbers indicate identical or functionally similar elements. Additionally, the left most digit(s) of a reference number identifies the drawing in which the reference number first appears.

COMPUTER PROCESSOR WITH GENERATION RENAMING

CROSS-REFERENCE TO RELATED APPLICATIONS

This non-provisional application claims the benefit of U.S. provisional application No. 61/984,709, filed 25 Apr. 2014 and entitled "Computer Processor With Generation Renaming," U.S. provisional application No. 61/984,710, filed 25 Apr. 2014 and entitled "Zero Overhead Loop," U.S. provisional application No. 61/984,711, filed 25 Apr. 2014 and entitled "Branch Prediction," U.S. provisional application No. 61/984,708, filed 25 Apr. 2014 and entitled "Stunt Box," U.S. provisional application No. 61/984,707, filed 25 Apr. 2014 and entitled "Resource Locking for Load/Store Scheduling in a VLIW Processor," and U.S. provisional application No. 61/984,706, filed 25 Apr. 2014 and entitled "Renaming with Generation Numbers," all of which are hereby incorporated by reference.

FIELD OF THE DISCLOSURE

The present disclosure relates generally to computer processors.

BACKGROUND

Advances in semiconductor manufacturing have made it possible to incorporate large amounts of logic circuitry on an integrated circuit. In turn, this has led to advances in digital systems architecture. One particular area of digital systems architecture that has benefited greatly from the capability to include vast arrays of logic circuitry on a single integrated circuit is processor design.

BRIEF DESCRIPTION OF THE DRAWINGS

Exemplary embodiments are described with reference to the accompanying drawings. In the drawings, like reference numbers indicate identical or functionally similar elements. Additionally, the left most digit(s) of a reference number identifies the drawing in which the reference number first appears.

FIG. 18 illustrates a portion of an architecture for implementing a zero overhead loop according to an embodiment of the disclosure.

FIGS. 1-18 illustrate various components, their arrangements, and interconnections, and as is the well-understood practice in this field, the figures are not necessarily drawn to scale.

DETAILED DESCRIPTION

Figure 1:
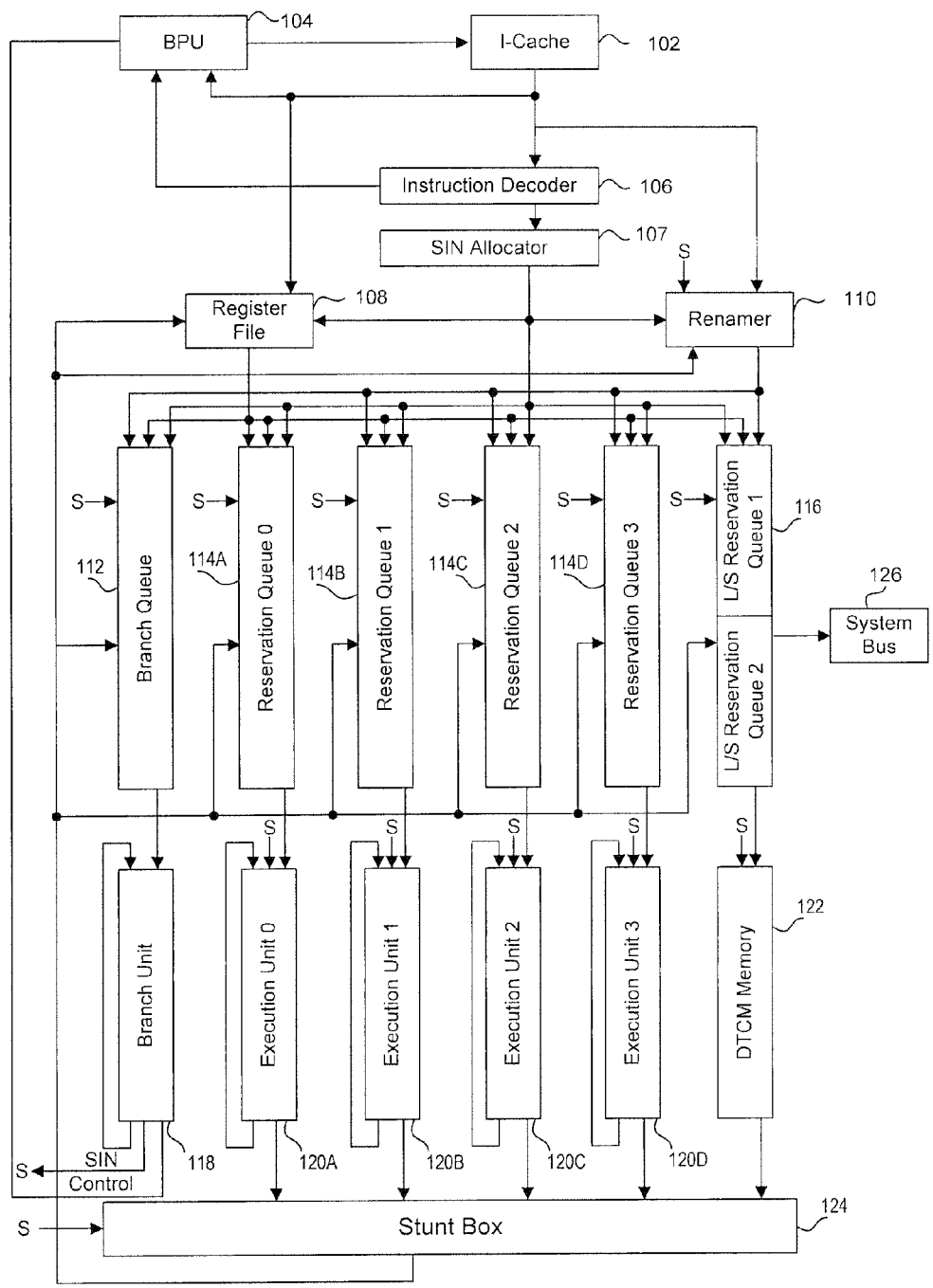
FIG. 1 is a high-level block diagram of an exemplary processor.

The following Detailed Description refers to accompanying drawings to illustrate exemplary embodiments. References in the Detailed Description to "one exemplary embodiment," "an illustrative embodiment," "an exemplary embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure.

It is to be understood that the phraseology or terminology herein is for the purpose of description and not of limitation, such that the terminology or phraseology of the present specification is to be interpreted by those skilled in relevant art(s) in light of the teachings herein.

TERMINOLOGY

The terms, chip, die, integrated circuit, semiconductor device, and microelectronic device, are often used interchangeably in the field of electronics.

FET, as used herein, refers to metal-oxide-semiconductor field effect transistors (MOSFETs). An n-channel FET is referred to herein as an NFET. A p-channel FET is referred to herein as a PFET.

CMOS is an acronym that stands for Complementary Metal Oxide Semiconductor, and refers to a semiconductor manufacturing process in which both NFETs are PFETs are formed in the same chip.

CMOS circuit refers to a circuit in which both NFETs and PFETs are used together.

SoC is and acronym that stands for System on a Chip, and refers to a chip that includes two or more circuit blocks, typically interconnected by a bus, where those circuit blocks provide such high levels of functionality that these blocks would have been considered system-level components in the past. By way of example, circuit blocks having the requisite level of functionality as of this date include scalar, superscalar, and very long instruction word processors; DRAM controllers (e.g., DDR3, DDR4 and DDR5); flash memory controllers; Universal Serial Bus (USB) controllers; and the like. This list is intended to be illustrative and not limiting. Another common way of describing an SoC is a chip that includes all the components that would be needed to implement an electronic system such as, for example, a computer system or a computer-based system.

VLIW is an acronym for Very Long Instruction Word.

VLIW instruction, as used in the description of exemplary embodiments herein, refers to a set of instructions grouped together for presentation to the instruction decoder. The individual instructions in the set of instructions are assigned to one of a plurality of execution pipes for execution.

IC0 refers to a pseudo-stage which is on the input to the instruction cache.

IC1 refers to the instruction cache stage. Fetch requests to the instruction cache are made in this cycle, along with calculations to determine which PC to fetch next. VLIW instructions previously requested are supplied in this stage.

DE1 refers to the first stage of the instruction decoder.

DE1_operation refers to a logical operation performed by the first stage of the instruction decoder.

DE1_time refers to a cycle in which a DE_1 operation occurs.

DE2 refers to the second stage of the instruction decoder.

DE2_operation refers to a logical operation performed by the second stage of the instruction decoder.

DE2_time refers to the cycle in which the reading and renaming of the general register file (GRF) and predicate register file (PREG) occurs.

RS refers to a reservation station. There are several different reservation stations that can be enqueued to. In the best case this is a single cycle stage, however operations may end up queuing here for many cycles.

EXn refers to an nth stage of an execution pipe. Examples of execution pipes include ALU short and long pipes, BRANCH and the Load Store Unit.

SHP refers to a short execution pipe. A short execution pipe is used to perform single cycle operations.

LOP refers to a long execution pipe. A long execution pipe is used to execute instructions that take 2-8 cycles to complete.

LSU refers to the load store unit.

DTCM refers to a data tightly coupled memory.

PBUS refers to a bus that connects to a peripheral memory.

DCACHE refers to the data cache used to cache accesses to peripheral memory.

Enqueue refers to the action in which a VLIW instruction in DE2 is split into its component operations and then move forward down the pipe into the reservation stations.

Issue refers to moving an operation from the reservation station to an execution unit. An operation is referred to as being issued when it is moved from the reservation station to an execution unit. An operation is a component part of a VLIW instruction.

Current PC refers to the value of the program counter (PC) for the instruction currently in a given stage. Each stage of the pipe will have its own version of the current PC.

Next PC refers to the next PC to fetch from the Icache. For straight line code this will be current PC+current instruction width, for redirected code it will be the new target PC.

Loop start address refers to the address of the first instruction in a loop body, i.e., the address to branch to for starting a new loop iteration.

Loop end address refers to the address of the first instruction after a loop body, i.e., the address to branch to for naturally exiting the loop.

Loop body refers to the instructions beginning with the loop start address and ending with the loop match address.

Loop match address refers to the address of the last instruction in a loop body.

Loop count refers to the number of iterations of the loop that should be executed. This comes from either an immediate field for LOOP operations, or a general register for ZLOOP and ZLOOPS operations.

SIN refers to the Speculation Index Number, which is used to identify instructions enqueued speculatively in the shadow of a branch.

SIN resolution refers to determining whether a branch was correctly speculated or not. SIN resolution is performed in EX1.

SIN validation refers to a branch in EX1 that was correctly speculated, which in turn will validate the SIN associated with the operations in the shadow of the correctly speculated branch. A validated operation is one which will update the architectural state.

SIN cancellation refers to a branch in EX1 that was incorrectly speculated, which in turn will cancel all outstanding SINs, and perform an EX1 redirect, effectively removing all operations that were in the shadow of the branch it from the execution pipe. In one embodiment, removing the operation that were in the shadow of the incorrectly speculated branch includes changing the state of a bit associated with each of those instruction in the execution pipe.

State coherency enforcement (SCE) refers to actions performed by an internal mechanism to prevent future operations from seeing an incoherent machine state.

Trap events refers to the set of synchronous, asynchronous and fault events.

Synchronous trap events relate to a specific instruction and are detected in time to prevent the instruction causing the event from being enqueued. The Supervisor Call (SVC) instruction fits into this category. These are precise as they occur in an architecturally defined place in the instruction stream.

Asynchronous trap events (interrupts) occur independently from the current instruction sequence. Asynchronous exceptions fit into this.

Fault trap events prevent program flow from recovering. Examples of fault trap events are a misaligned PC and a data abort. Faulting operations with a register destination must complete a register value.

Processor Overview

A processor architecture is disclosed that includes a register file having a plurality of registers, is configured for out-of-order instruction execution, and further includes a renamer unit that produces generation numbers that are associated with register file addresses to provide a renamed version of a register that is temporally offset from an existing version of that register rather than assigning a non-programmer-visible physical register as the renamed register. The processor architecture includes a small reset dual history length (DHL) Gshare branch prediction unit coupled to an instruction cache and configured to provide speculative addresses to the instruction cache. The processor architecture is suitable for implementation in an integrated circuit. Such an integrated circuit is typically, but not necessarily, implemented with CMOS circuitry.

In an exemplary embodiment, a processor in accordance with this disclosure is implemented in an integrated circuit as an embedded processor.

FIG. 1 is a high-level block diagram illustrating the major blocks of an exemplary processor in accordance with the disclosure. The exemplary processor includes an instruction cache 102 coupled to receive a VLIW instruction address from a branch prediction unit 104, and further coupled to provide an output to branch prediction unit 104, an instruction decoder 106, a register file 108, and a generation renamer 110. Generation renamer 110 is coupled to branch execution unit 118 to receive a SIN control signal, coupled to the SIN Allocator to receive a SIN number, coupled to a stunt box 124 to receive an output from an operand copy network, and coupled to the branch reservation queue 112, execution pipe reservation queues 114A, 114B, 114C, 114D, and load/store reservation queue 116. Register file 108 is coupled to stunt box 124 to receive input from the operand copy network, and is further coupled to the branch reservation queue 112, execution pipe reservation queues 114A, 114B, 114C, 114D, and load/store reservation queue 116. Branch reservation queue 112 is coupled to branch execution unit 118. Execution pipe reservation queues 114A, 114B, 114C, 114D are each respectively coupled to corresponding execution pipes 120A, 120B, 120C, and 120D. Execution pipes 120A, 120B, 120C, and 120D are each coupled to provide output to stunt box 124. Each of execution pipes 120A, 120B, 120C, and 120D are respectively coupled to provide their output back to their inputs, and each is further coupled to the output of branch execution unit 118 to receive the SIN control signal. A memory 122 is coupled to the load/store unit 116. And load/store unit 116 is further coupled to a system bus 126.

Instruction cache 102 holds VLIW instructions that have been previously fetched by an instruction fetch unit (not shown). The VLIW instructions are typically fetched from a memory disposed external to the processor itself. Branch prediction unit 104 is shown coupled to instruction cache 102. Branch prediction unit 104 provides the address of the VLIW instruction to fetch. If the requested VLIW instruction is present in instruction cache 102 then it is provided to an instruction decoder 106. If the requested VLIW instruction is not present in instruction cache 102 then a cache miss has occurred and the requested instruction is fetched from a memory that is disposed outside of the processor.

Branch prediction unit 104 has several functions, including providing the program counter value needed by instruction cache 102, and the program counter value needed by different stages and logic blocks throughout the processor. For sequentially executing program code, the program counter value simply changes by the length of the instruction just fetched. But when a branch instruction is detected, then branch prediction unit 104 determines what from what address the next instruction should be fetched. In this exemplary processor, branch prediction unit 104 uses a small reset DHL Gshare branch prediction mechanism to determine the next instruction address.

Instruction decoder 106 decodes the content of the VLIW instructions and provides control information to various other blocks of the processor.

Register file 108 contains a predetermined number of programmer-visible registers. These registers hold values that are used during the execution of a program.

Individual instructions obtained from the VLIW instruction are enqueued into a selected reservation queue. When the operands needed for execution of an enqueued instruction become available, that instruction is issued to the execution pipe associated with the selected reservation queue.

Generation renamer 110 is used to assign generation numbers to register instances in instructions when those register instances would conventionally be reassigned to a different non-programmer-visible physical register.

The reservation queues hold instructions that are waiting to be issued.

Stunt box 124 provides a mechanism for receiving and distributing the outputs of the execution pipes. Stunt box 124 provides data to an operand copy network. The operand copy network allows all the results of the execution pipes to be made available to other blocks within the processor. In this way, an instruction waiting for an operand to be produced from the execution of another instruction does not have to wait for that operand to be written back to the register file and then read out of the register file. Rather the required operand is made available, via the operand copy network, to all the locations throughout the processor that are waiting for that particular result.

System bus 126 provides a mechanism for the embedded processor to communicate with other logic blocks on the integrated circuit that are external to the processor itself.
Renaming with Generation Numbers Processors comprise a number of different physical resources, for example registers, execution units, arithmetic units, memory, control logic, etc. One of the physical resources included in processors is an architecturally visible set of registers that are available to programmers for use when creating software. These registers physically store information to be used by the processors, as directed by the software. The number of available registers within the set of registers is determined based on the design of the processor and the instruction set implemented. Because there are a set number of registers, programmers are often required to reuse registers when creating their software.

The processor, when executing the software needs to make sure that the correct value is in each register at the correct instant in time in order to ensure that programs execute properly. This is true for out of order machines that can execute instructions in different orders depending on what resources are available, and even more so for very large instruction word (VLIW) processors which can fetch, decode, and execute multiple instructions in parallel.

In order to address these issue, generation renaming was developed. Generation renaming allows a process to maintain a value for each architectural register in a register file, while allowing multiple versions, named generations, of each register to exist within the machine. Each generation represents a new value that will, or may, be stored in a register. Different registers may use different generations at the same time. For example, the machine may be using generations 2, 3, and 4 of R0 while using generations 5 and 7 of R1. Architecturally, each register has a value associated with it, a means of maintaining which generations are currently being used, and a set of pointers used to identify the last known correctly used generation and any speculatively used generations. These components will be described in more detail below.

As individual instructions are in flight, for example waiting to be executed, being executed, or waiting to be retired, the registers associated with the individual instructions maintain descriptors indicating which generation of each register are being used by this instruction. Thus, multiple instructions using the same register to be in flight at the same time while allowing the software to execute as intended. Instructions can be maintained until the correct generation of each of their source registers is available. Instructions can execute, even if they use the same destination register. And instructions can retire, even if would modify the same register, without causing errors in the program execution. With minimal additional logic, mostly related to forwarding the correct values to the correct instructions, the processor can execute while maintaining a register file associated with architecturally visible registers. For example, as instructions retire, the value of the destination register can be forwarded to an in-flight instructions that require that register with that generation. In an example, if this is also the last generation of the register in flight, the value can also be written to the register file.

Generations allow the processor to fetch, queue, and execute multiple instructions at the same time that use the same architectural register. This reduces or eliminates the need to stall the execution pipeline to wait for results of prior instructions. For example, a programmer may wish to execute the following code using only 6 registers:

Inst 0: Add R0, R1, R2
Inst 1: Mul R1, R0, R0
Inst 2: Add R0, R4, R5
Inst 3: Mul R4, R0, R0

In this code, the programmer adds the values in R1 and R2 and stores the result in R0. That result (stored in R0) is then squared and stored in R1. Next, the values in R4 and R5 are added and the result is stored again in R0. Similarly, this result is squared and stored in R4.

Typically, a processor must either stall Inst 2 until Inst 1 is complete (or risk R0 containing the wrong value when Inst 1 executes), or use an register that is not visible to the programmer to enlarge the set of available registers and remove the write after read (WAR) fault caused by reusing register R0. If this is not done, the value in R0 may be incorrect, thus storing an unexpected value in R1. Stalling the machine each time a fault is encountered can significantly reduce the performance of the processor. Increasing the size of the register file that stores both the architectural registers and the non-programmer visible registers can alleviate this issue. But this requires increasing the forwarding logic and renaming logic to track which registers store the value for which architectural registers being used by which instructions. And an increase in the number of physical registers increases power consumption and chip area.

Generation renaming allows the processor to maintain a register file with architectural registers, while allowing the processor to enqueue and execute instructions in parallel even when those instructions specify the use of the same register. Specifically, this allows two instructions that change the value of the same register to both be, enqueue, issued and executed without affecting the execution of the remained of the software that depends on either instruction. Each time a register is used as a destination, it is tagged with a new generation number. Each instruction that uses the register after that, will use the new generation, until the generation number is increased again. Once the initial instruction executes and a value is determined for the register, all pending instructions that use that register and that generation number can be updated to indicate they have a valid value for this register.

Returning to the example above, we will use the convention Rn®m to represent Rn generation m. For the above code segment, we will assume that the generation information of the registers is R0®0, R1®1, R2®1, R4®3, and R5®0. In this exemplary embodiment, when the instructions are enqueued, the generation numbers are assigned as follows:

Inst 0: Add R0®1, R1®1, R2®1 (Generation of R0 is increased, R1 and R2 remains the same)
Inst 1: Mul R1®3, R0®1, R0®1 (Generation of R1 is increased, R0 remains the same)
Inst 2: Add R0®2, R4®0, R5®1 (Generation of R0 is increased, R4 and R5 remains the same)
Inst 3: Mul R4®4, R0®2, R0®2 (Generation of R4 is increased, R0 remains the same)

Thus generation renaming allows Inst 2 to be issued and executed without affecting the results of Inst 1. In the above example, if Inst 2 executes before Inst 1, the results of Inst 2 will be forwarded to all other instructions that use R0®2 without affecting instructions that use other generations of R0. For example, once executed, an instruction's results may be copied by any inflight instructions that are waiting for those results. And as will be discussed below, the. For example, if we have two execution units, each of our instructions can be queued to a different execution unit. If Add instructions execute faster than Mul instructions, then we might have something like what follows:

Time 1: Put Inst 0 in Queue 0; Put Inst 1 in Queue 0; Put Inst 2 in Queue 1; Put Inst 3 in Queue 1;
Time 2: Execute Inst 0 and Inst 2 (neither depends on the results of any previous instructions)
Time 3: Retire R0®1; Update Inst 1 and Inst 3 appropriately; Execute Inst 1 and Inst 3, using the results from Inst 0 and Inst 2 (this assumes that for this processor the result from Inst 2 can be forward back to Inst 3.)

Alternatively:

Time 1: Put Inst 0 in Queue 0; Put Inst 1 in Queue 0; Put Inst 2 in Queue 1; Put Inst 3 in Queue 1;
Time 2: Execute Inst 0 and Inst 2 (neither depends on the results of any previous instructions)
Time 3: Retire R0®1; Update Inst 1 appropriately; Start execution Inst 1, using the results from Inst 0.
Time 4: Retire R0®2; Update Inst 3 appropriately; Start execution Inst 3, using the results from Inst 2.

Thus generation renaming allows multiple instructions to exist in the processor concurrently. These instructions can be executed out of order while appearing to executing in order (i.e., the results from the out of order execution and the in order execution are identical). Generation renaming allows this to happen by allowing multiple versions of each register to exist in the processor so that instructions can update and use the same register without interfering with the execution of each other.

Generation Renaming Structure

Figure 2:
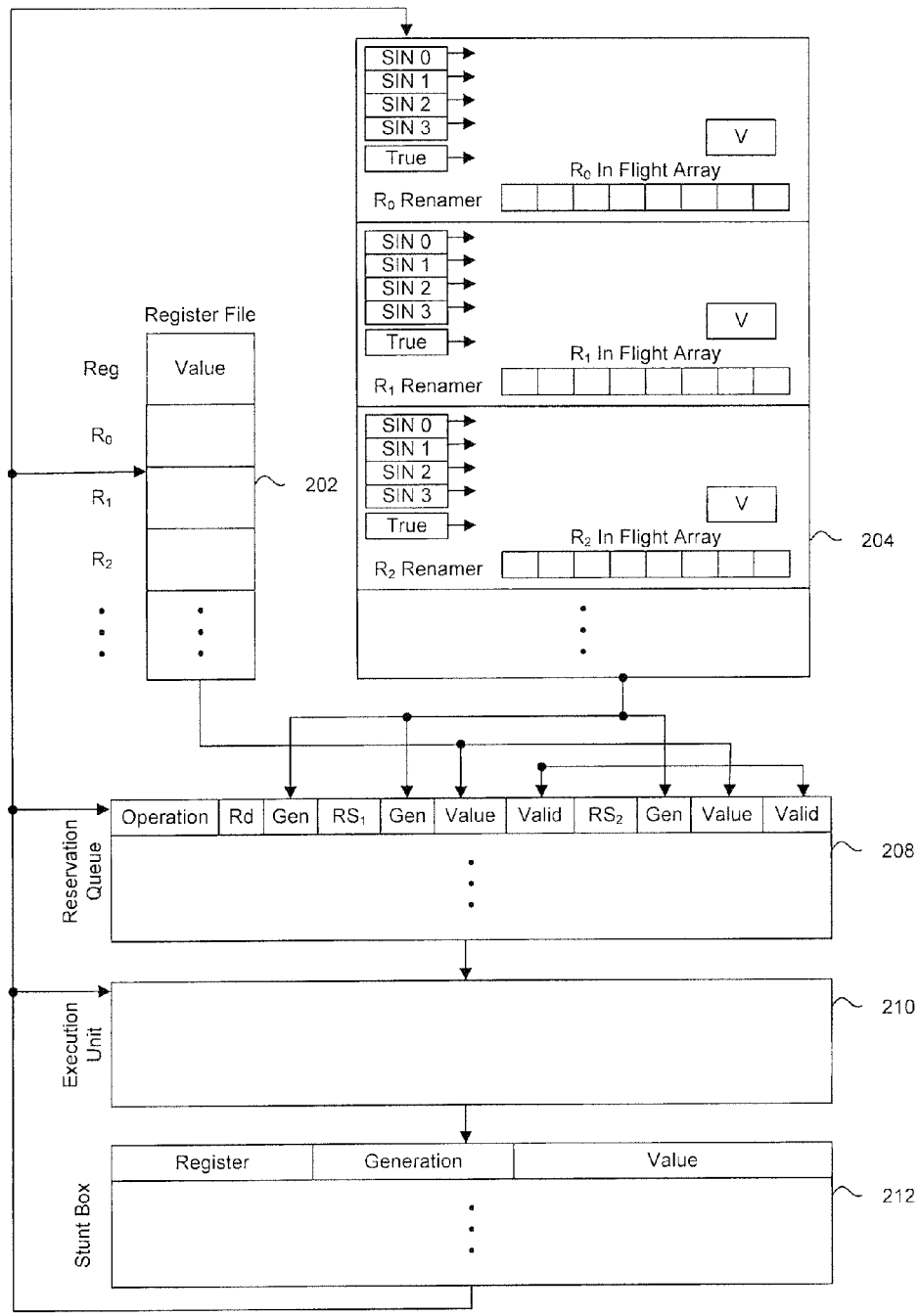
FIG. 2 is a high-level block diagram of an exemplary processor with register renaming implemented.
Figure 3:
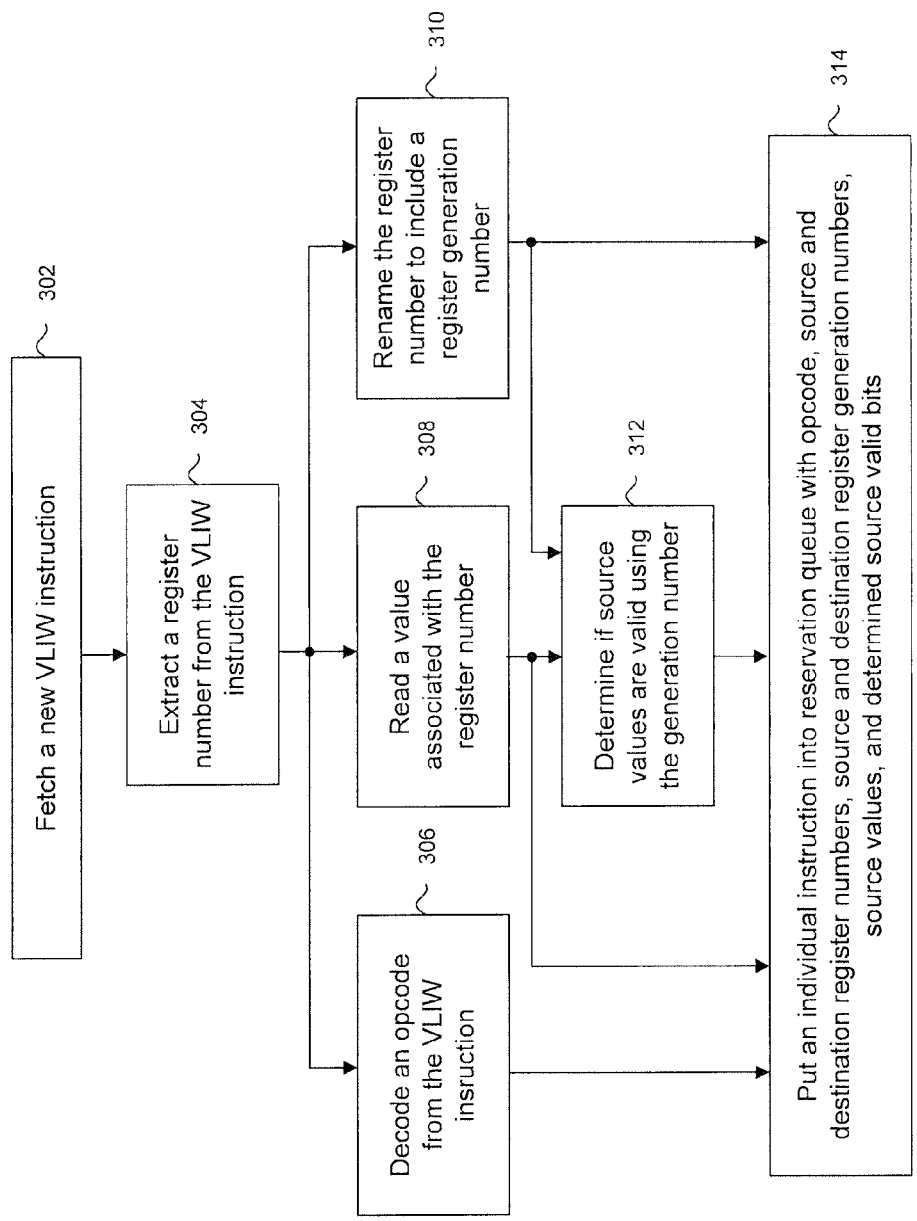
FIG. 3 is flowchart illustrating a register renaming process, according to an example embodiment.

Referring to FIG. 2, an exemplary embodiment of a processor includes a register file 202, a renamer 204, a reservation queue 208, an execution unit 210, and a stunt box 212.

Register file 202 is configured to store the value of each architectural register. For example, register file 202 can store the values for general registers R0-R32, predicate registers P0-P7, and multiply-and-accumulate (MAC) registers M0-M7. In an embodiment, register file 202 includes write control circuitry that controls when results from the execution pipes are to be written into the architectural registers of the register file.

In an embodiment, the processor includes renamer 204 for one or more of the architectural register. Renamer 204 can include an inflight array 216, a true pointer 218, one or more speculative instruction number (SIN) pointers 220, an enable circuit 222, and a validation circuit 224. Each Inflight array 216 indicates which generations of a register are currently being used by the processor. For example, inflight array 216 may indicate that generations 2, 4, and 5 for R0 are currently being used by the processor.

Thus, each inflight array 216 maintains a list of all generations for each register that are currently being used by instructions in the processor. Inflight array 216 can be a circular array. Thus, after allocating the last generation in the array, for example generation 7, the next generation allocated would be generation 0. These generations may be used in the reservation queue, Load/Store (L/S) queues, execution units, stunt box, etc.

In order to determine which generation is the latest generation in use, true pointer 218 is used for each architectural register. Each true pointer 218 points to a location in the associated inflight array 216 which represents the last generation of this register that was used as a destination for an instruction. For example, in the above code fragment, after Inst 3 is fetched and renamed, the true pointer 218 for R0 would point to R0®2, the true pointer 218 for R1 would point to R1®3, and the true pointer 218 for R4 would point to R4®4. True pointer 218 can be used in several ways. For example while an instruction is being decoded, true pointer 218 points the generation of the registers being used for the sources of the instruction. For the destination, the generation can be set to the next generation after the true pointer.

In an embodiment, when a result is retired, a few different things can happen. The value for this generation of the register can be forwarded to all instructions using this generation of this register that are currently in the reservation queues and the valid bit for those registers can be set. The valid bits allow the processor to determine which instructions are ready to issue for execution. In an embodiment, if the value is not speculative, i.e., it was not generated after a conditional branch instruction whose results we guessed, the in-flight bit for this generation in the associated inflight array 216 is cleared.

Enable circuit 222 also uses the retired result value, retired result generation number, and true pointer 218 to determine if this result should be written to register file 202. True pointer 218 points to the last generation of a register that was non-speculatively executed. That is, true pointer 218 points to the last generation of a register that was allocated prior to any conditional branches that the processor has speculatively predicted. If the retired result generation number matches true pointer 218, there are no non-speculative instructions in-flight that write to this register. At that point the value can be written to register file 202. Thus, enable circuit 222 can set the write enable for this register and have the retired result value written to register file 202. This can limit the number of unnecessary writes that are made to register file 202.

In addition to true pointer 218, one or more SIN pointers 220 are also allocated to each register. SIN pointers 220 are used to track generations of a register which have been allocated to instructions which have been speculatively fetched, enqueued, or executed. For example, the following code segment retrieves a value from memory in Inst 0 and executes Inst 1-6 the number of times equal to the retrieved value. Inst 1-6 takes an array starting at memory location 0x00200020 and doubles each element:

Inst 0: LD R0, [0x10]
Inst 1: ADD R1, 0x00200020
Inst 2: LD R2, [R1]
Inst 3: MUL R2, R2, 0x2
Inst 4: ST R2, [R1]
Inst 5: SUB R0, R0, 0x01
Inst 6: BNZ Inst 1

When the processor reaches Inst 6, it must make a determination to either return to Inst 1, or continue execution with the next sequential instruction. This determination is based on the value in R0. This instruction attempts to load R0 with the value located at memory location 0x10. This may take some time to retrieve from memory, especially if the value is located in main memory, rather than in a cache. While this value is being retrieved from memory, the processor may decide to speculatively execute additional instructions. It may determine, based on past history for example, to branch back to Inst 1.

Because of the time required to retrieve information from main memory, this loop may be speculatively executed multiple times. While the processor knows that the results from the first execution are correct, each additional iteration will be speculative until we receive the value from memory requested by Inst 0.

Thus, for each speculative execution of Inst 6, a new SIN pointer 220 is allocated. For each SIN pointer 220, a new version of R1 and R0 are allocated (see Inst 1 and 5), and two new versions of R2 are allocated (see Inst 2 and 3) (the store instruction—Inst 4—does not have a register destination). After 4 runs of the loop, R1 and R2 may look like this:

R1.True Pointer=>R1®1
R1.SIN0 Pointer=>R1®2
R1.SIN1 Pointer=>R1®3
R1.SIN2 Pointer=>R1®4
R1.SIN3 Pointer=>R1®5
R1.Inflight Array=011111000 . . . 0
R2.True Pointer=>R2®0
R2.SIN0 Pointer=>R2®2
R2.SIN1 Pointer=>R2®4
R2.SIN2 Pointer=>R2®6
R2.SIN3 Pointer=>R2®8
R2.Inflight Array=1111111110 . . . 0

If at this point, the load to R0 completed and it has a value greater than 4, then each of the speculatively executed instructions is confirmed, the SIN3 pointer for each of these registers is copied into the True pointer, and execution continues without speculation. But if the value is less than 4, for example 2, one or more the of executions must be unwound. The correct pointer, for example SIN1 pointer, is copied into the True Pointer, all in flight bits between the new true pointer and the most recently allocated SIN pointer, for example SIN3 pointer, are cleared, for example R1.Inflight Array bits 4-5 and R2.inflight Array bits 5-8.

Because the resulted from speculatively executed instructions are not loaded into register file 202, no changes need to be made to register file 202.

In an embodiment, renamer 204 can also determine if the values in the register file are valid. When an instruction is decoded and added to the enqueued in a reservation queue, the value of that register stored in register file 202 is also copied into the reservation queue. In addition, a valid bit is set indicating whether this source register value is valid or not. Validation circuit 224 handles setting that bit. If the generation of a register pointed to by the true pointer (or the most recently allocated SIN pointer, if we are speculatively executing this instruction) is 1, then the valid bit is cleared, and if it is 0, then the valid bit is set. This means that if the value for this generation of the register is still being calculated (i.e., still inflight), then the value in register file 202 is not valid, but if it has been retired, then the value in register file 202 is valid. Once all the source register valid bits are set, an instruction is ready to be issued for execution.

Generation Renaming Process

In an exemplary embodiment, the processor can be configured to perform generation renaming while a VLIW instruction is being decoded. In another embodiment, generation renaming can be performed after a VLIW instruction has been decoded.

At step 302, the processor fetches a VLIW instruction. For example a processor fetches the next cache line pointed to by a program counter (PC). This cache line can include a VLIW instruction that can be made up of multiple individual instructions. For example, depending on implementation details, VLIW instructions can be made up of 2, 4, or 8 individual instructions. In other embodiments, the VLIW instructions can be made up other numbers of individual instructions, for example 3, depending on the implementation details, as would be understood by a person skilled in the art.

At step 304, the registers used as sources and destinations within the VLIW instruction can be identified. This information can be provided to the remainder of the instruction decode unit, the register file, and the renamer as described in more detail below. As part of the instruction decode, registers associated with each instruction can be identified (i.e. the source and destination registers). In another embodiment, the registers can be identified as part of a separate unit and passed to the instruction decode unit, register file, and renamer.

At step 306, one or more instructions within the VLIW instruction can be decoded. In one embodiment this is part of the second phase of the instruction decode unit, the first phase comprising identifying the registers. One advantage of doing a two-step decode is that register identification, which may be simple and fast, can happen early in the cycle, allowing other elements to process the instruction that rely on the registers being identified.

At step 308, the register file, for example register file 202, can be accessed and the value of a generation of any source registers used in the VLIW instruction can be identified. At this point, the last generation of a source register that was written to the register file is identified. This value may or may not be valid. Thus, this value is speculatively associated with the VLIW instruction. As will be addressed below, a valid bit will be set indicating whether this value is the correct value for the generation needed for the source register for this VLIW instruction.

At step 310, a generation number is associated with the register number that was identified in step 304. This generation number indicated which value associated with a register number is required for completing an instruction. For example, if a VLIW instruction indicated that it uses register R0 as a source register, then the latest generation of R0 that is currently being used in the processor can be associated with the VLIW instruction. This may be a generation of R0 that is currently in-flight and will become available sometime in the future. Or this may be a generation of R0 that was calculated earlier and is available for use. In another example, if the VLIW instruction indicates that the register number is a destination register, then the next available non-inflight generation of R0 is associated with this VLIW instruction. For example, if generations 3-6 are currently in flight, R0 generation 7 will be associated with the VLIW instruction.

In an embodiment, pointers, such as the true pointer or SIN pointers discussed above, can identify the latest generations of a register currently in flight. For example, if instructions are currently being fetched that are not speculative (i.e., all prior branch instructions have been resolved) the true pointer may be used to identify the latest valid generation of a register. If instructions are being speculatively fetched then a SIN pointer may be used to identify the latest valid generation of a register.

In an embodiment, source registers may be tagged to indicate that they use a value produced by this VLIW instruction. For example, a first individual instruction may increment a value that was retrieved by a second individual instruction, where both are contained within the same VLIW instruction. In this embodiment, the source register identified for the first individual instruction can include a tag within the VLIW instruction indicating that it uses the results from another individual instruction within the VLIW instruction. If so tagged, rather than being associated with last in-flight generation available for the register, the source register for the first individual instruction will be associated with the next available non-inflight generation. This will be the same generation for the destination of the second individual instruction, thereby indicating that the results of the second individual instruction can be forwarded to the first individual instruction when available.

At step 312, for identified registers that are identified as source registers for the VLIW instruction, determine whether the value retrieved from the register file is valid. For example, the inflight array for the register number can be examined. If the pointer to the last generation used indicates that that generation is not currently inflight and the last generation used matches the generation of the source register for the VLIW instruction, then the valid bit can be set. The value retrieved from the register file is the correct version for the generation of the source register being used. In an embodiment, the valid bit will only be set if there are no SIN pointers being used (i.e., no instructions are being speculatively executed) and the true pointer At step 314, the individual instructions are added to the reservation queues. This includes adding the opcode of the instruction to be performed, source and destination register numbers, associated generation numbers, values for the source registers, and source valid bits are also added to the reservation queue.

Resource Locking for Load/Store Scheduling

In addition to using the same registers, instructions within a program often specify the use of the same resources. Resources can include, but are not limited to, specific registers, for example Multiply-and-Accumulate (MAC) registers, or memory, for example each bank of a memory array. In an embodiment, some or all of these types of resources can be accessed concurrently. In an embodiment, there can be limitations associated with different resources, for example a MAC cannot be written to by two instructions as the same time or two instructions can only write to the same a memory bank at the same time if they are writing to different addresses or different bits within the same address.

In an embodiment, for instructions that update resources, logic circuitry may be used to determine when the physical resource can be updated at any time. For an instruction that updates a MAC register, the processor's control logic may evaluate other pending instructions that update MAC registers. If any older pending instruction updates the same MAC register, this instruction may need to stall before attempting to make an update to the MAC register.

In an embodiment, each time an instruction that updates a resource, is fetched and enqueued, the state information for that instruction can be set with regard to all pending instructions that update resources. This state can be maintained between processor clock cycles.

In an embodiment, for each cycle in which one or more instructions are enqueued that update resources, the processor can identify any instructions that are resource independent. An instruction that can execute without conflicting with any other pending or executing instructions is resource independent. In an embodiment, an instruction that is resource independent is an instruction that does not update the same resource as any older enqueued instruction. For example, if an instruction is a MAC instruction and updates MAC3, the processor would identify that instruction as resource independent if no older enqueued instructions also updated MAC3. Otherwise the instruction will be identified as being dependent on the same resource as an older instruction until all resource dependencies are cleared.

In an embodiment, the processor can identify all instructions that are resource independent. This list represents all the instructions that could possibly issue in this cycle. The processor can then select one or more instructions from the queue to be issued. In an embodiment, the processor can select based on the position of the instruction, for example selecting older instructions before younger instructions. In an embodiment, the processor can select based on the number of resources updated, for example selecting instructions that update more resources over those that update fewer (possibly because more instructions will be held up by those instructions). The processor can select instructions to issue from the set of resource-independent instructions based on the type of operations performed by the instructions. For example, the processor may allow extra instructions to issue depending on how the processor is designed (e.g., if the processor can issue 2 MAC instructions, but only one predicate update instruction, and both MACs and predicates are resources, then the processor may prefer to issue MAC instructions over predicate update instructions).

In an embodiment, the Load/Store (L/S) unit can be divided into two parts. Once a L/S instruction is fetched it is placed in the first portion of the L/S unit. The instruction will remain in the first portion of the L/S unit until it is ready to execute. For load instructions, once the memory address where information is being loaded from has been determined the instruction is ready to execute. For store instructions, once value being stored and the memory address where the value is being stored have been determined the instruction is ready to execute.

Once a L/S instruction is ready to execute it is moved from the L/S unit and placed on the top of the queue of instructions in the second portion of the L/S unit. In an embodiment, each instruction within the second portion of the L/S unit is associated with additional state information that can be used to select one or more instructions to issue.

In an embodiment, the state information includes state regarding whether the operands for a store instruction are speculative or not. Store instructions change memory. Changes to memory can be difficult to undo or roll back. Thus, in some embodiments, store instructions are not executed, and changes are not made to memory, until the processor is certain that the store instruction the correct operands are available to execute the store instruction.

In an embodiment, the state information can indicate the relation of a L/S instruction with other L/S instructions, specifically whether it can issue or whether it is blocked from issuing by one or more other L/S instructions in the L/S unit. For example, if there are three L/S instructions currently in the L/S unit, when a new L/S instruction is added to the L/S unit, the state information for the new L/S instruction will contain state information with regard to each of the three older L/S instructions.

In an embodiment, the state information can include an indication of whether an L/S instruction is ready to issue. For any given cycle, multiple L/S instructions may be ready to issue. Once all L/S instructions within the L/S unit are analyzed, the one or more L/S instructions are selected to issue from the L/S instructions that indicate they are ready to issue. In an embodiment, the oldest ready-to-issue L/S instructions can be selected. In another embodiment, ready-to-issue load instructions can be selected before ready-to-issue store instructions. Other methods of selecting and issuing L/S instructions may be used in accordance with processor and system design trade-offs.

In an embodiment, the state information can indicate the relation between the addresses of two L/S instructions. In an embodiment, the state information can indicate four states—independent, mutually exclusive, mergeable, and clash. In the divided L/S unit embodiment described above, as each L/S instruction is moved from the first portion of the L/S unit to the second portion of the L/S unit its state information can be generated with respect to every other instruction currently in the L/S unit. This generated state information can be maintained until the L/S instruction is issued, and can be updated as other L/S instructions are issued ahead of it.

In an embodiment, if a L/S instruction is marked as independent of an older instruction, it means that the two instructions can each issue if ready. In an embodiment, an instruction may be marked as independent of another instruction, with respect to a memory resource, if the execution of each instruction accesses different memory resources. For example, if the memory array has 4 banks, each of which can be read or written, independent of the other memory banks, then two instructions that read or write to different memory banks would be marked as independent.

In an embodiment, if a L/S instruction is marked as mutually exclusive of an older instruction, it means that either instruction could issue if both are ready, but that both could not issue in the same cycle. Thus, if both were ready to issue during the same cycle, the younger one could issue, the older one could issue, but both could not issue together. In the above example where the memory array has four independent memory banks, if execution of each instruction would read from or write to the same bank, but different indexes within that bank, either instruction could execute when ready, but both could not execute together since each memory bank could only be written to or read from once in a single cycle.

In an embodiment, if a L/S instruction is marked as mergeable with an older instruction, it means that the younger instruction can execute with or after the older instruction, but not before. Thus, if the younger instruction is ready to be issued, it can issue during the same cycle as the older instruction, or any cycle thereafter, but cannot issue if the older instruction has not issued or been selected to issue. For example, where the memory array has four independent memory banks, if both instructions are store instructions and execution of each writes to one or more same memory locations (for example if they both have an overlapping byte that they write to), the younger instruction would be marked as mergeable. In this example, if the older instruction was able to issue, but not the younger instruction, there would be no problem. But the younger instruction must wait for the older instruction to execute, or else the overlapping byte might end up with the wrong value (the value from the older instruction that will issue in the future, rather than the younger instruction that is ready to issue). And if both instructions are ready to issue, they can issue concurrently. The value of the overlapping byte can be set to the value that the younger instruction would store in that location.

In an embodiment, if a L/S instruction is marked as clash with an older instruction, it means that the younger instruction must issue after the older instruction. For example, in the above example where the memory array has four independent memory banks, if the older instruction is a store and the younger instruction is a load, and they both access at least one identical location in memory, then the younger instruction must wait for the older instruction to issue before being issued itself. If the younger load issues before the older store, it will retrieve the wrong value for any overlapping locations.

Below is an example of how L/S instructions may be tracked within the L/S unit, along with their associated status indications. The below example uses a simplified memory structure in order to illustrate the above conditions and relations. This example uses the four bank memory example, used above, where each bank includes a number of indexes (i.e., rows), as illustrated below.

|  | B0 | B1 | B2 | B3 |
|---|---|---|---|---|
| Index 0 |  |  |  |  |
| Index 1 |  |  |  |  |
| Index 2 |  |  |  |  |
| Index 3 |  |  |  |  |
| Index 4 |  |  |  |  |
| Index 5 |  |  |  |  |
| Index 6 |  |  |  |  |
| Index 7 |  |  |  |  |

In this example, at time 1, a store instruction is moved to the L/S unit. This store instruction stores data to both bank 0 and 1 at index 3. Because there are no other instructions in the L/S unit at the moment in this example, its status is clear. In addition, the ready status is clear, indicating that this instruction is currently speculative. In the below examples, we will use the following convention to describe the L/S instructions—St [R0], R1$_{13,\ B0/1}$. In this convention "St" is the instruction—"St" for Store or "Ld" for load. "[R0]", i.e., the first operand, is the destination. In this example, the "[ ]" indicate that the destination is the address pointed to by R0. For example, if R0 was 0x00010000, this instruction would eventually store a value to address 0x00010000 in memory. "R1," i.e., the second operand, is the source. In this example, this is the value that will be stored in the address pointed to by R0.

| Time 1:<br>St [R0], R1$_{I\,3,B0/1}$ | Ready | 0<br>0.St | 1 | 2 | 3 | Issue |
|---|---|---|---|---|---|---|

At time 2, a second store instruction is moved to the L/S unit. This store instruction also stores data to bank 0, but at index 1. The processor then updates the status of this instruction relative to all existing instructions. This instruction is not speculative, so it is ready to be evaluated. Because this instruction writes to the same memory bank as the first store instruction, but to different indexes, the instructions are mutually exclusive. Either one can execute at any time relative to the other one, but they cannot execute at the same time.

| Time 2:<br>St [R2], R3$_{I\,1,B0/0}$<br>St [R0], R1$_{I\,3,B0/1}$ | Ready<br>Y | 0<br>1.St<br>0.St | 1<br>ME | 2 | 3 | Issue |
|---|---|---|---|---|---|---|

At time 3, a load instruction is moved to the L/S unit. This load instruction retrieves information from bank 1 at index 3. At least one portion of the memory accessed by this load instruction matches the memory written to by the first store instruction. As this instruction is moved into the L/S unit, the processor updates the status of this instruction relative to all existing instructions. Load instructions are always ready to be evaluated. Because this instruction reads from to the same memory bank as the first store instruction, with the same index, and there is a memory overlap, the instructions clash. Either one can execute at any time relative to the other one, but they cannot execute at the same time. Because this instruction writes to a different bank than the second instruction, the instructions are independent of each other. Thus, the state looks like:

| Time 3:<br>Ld R4,<br>[R5]$_{I\,3,B1/1\,(match\,St\,R0)}$<br>St [R2], R3$_{I\,1,B0/0}$<br>St [R0], R1$_{I\,3,B0/1}$ | Ready<br><br><br>Y<br>Y | 0<br><br><br>2.Ld<br>1.St<br>0.St | 1<br><br><br>C<br>ME | 2<br><br><br>I | 3 | Issue |
|---|---|---|---|---|---|---|

At time 4, a third store instruction is moved to the L/S unit. This store instruction writes information to bank 1 at index 3. No portions of the addresses of this store instruction overlap the previous load instruction. As this instruction is moved into the L/S unit, the processor updates the status of this instruction relative to all existing instructions. This store instruction is not speculative, so it is ready to be evaluated. Because this instruction writes to the same memory bank and index as the first store instruction, the instructions can be merged. This instruction can execute at the same time as the first store instruction or any time thereafter. This instruction writes to a different bank than the second instruction, so the instructions are independent of each other. Because this instruction writes to the same memory bank as the load instruction, with the same index, but there is no memory overlap, the instructions are mutually exclusive.

| Time 4<br>St [R6],<br>R7$_{I\,3,B1/1\,(no\,match\,Ld\,R4)}$<br>Ld R4,<br>[R5]$_{I\,3,B1/1\,(match\,St\,R0)}$<br>St [R2], R3$_{I\,1,B0/0}$<br>St [R0], R1$_{I\,3,B0/1}$ | Ready<br><br><br>Y<br><br>Y<br>Y | 0<br><br><br>3.St<br><br>2.Ld<br>1.St<br>0.St | 1<br><br><br>M<br><br>C<br>ME | 2<br><br><br>I<br><br>I | 3<br><br><br>ME | Issue |
|---|---|---|---|---|---|---|

At time 5, a second load instruction is moved to the L/S unit. This load instruction retrieves information from bank 1 at index 3. No portions of the addresses of this load instruction overlap the first store instruction but portions do overlap with the third store instruction. As this instruction is moved into the L/S unit, the processor updates the status of this instruction relative to all existing instructions. Load instructions are always ready to be evaluated. Because this instruction reads from the same memory bank as the first store instruction, with the same index, but there is no memory overlap, the instructions are mutually exclusive. This instruction loads from a different bank than the second store instruction, so the instructions are independent of each other. The first and second load instructions read from the same index and the same banks. Thus, the instructions are independent of each other. Nothing prevents one from executing before the other. Because this instruction reads from to the same memory bank as the third store instruction, with the same index, and there is a memory overlap, the instructions clash.

| Time 5:<br>Ld R8, [R9]$_{I\,3,B1/1\,(No\,match\,St\,R0,\,match\,St\,R6)}$<br>St [R6], R7$_{I\,3,B1/1\,(no\,match\,Ld\,R4)}$<br>Ld R4, [R5]$_{I\,3,B1/1\,(match\,St\,R0)}$<br>St [R2], R3$_{I\,1,B0/0}$<br>St [R0], R1$_{I\,3,B0/1}$ | Ready<br>Y<br>Y<br>Y<br>Y<br>Y | 0<br>4.Ld<br>3.St<br>2.Ld<br>1.St<br>0.St | 1<br>ME<br>M<br>C<br>ME | 2<br>I<br>I<br>I | 3<br>I<br>ME<br> | Issue<br>C |
|---|---|---|---|---|---|---|

In an embodiment, once the memory becomes available, for example when the system bus is available, the processor can analyze the pending L/S instruction in the L/S unit to determine which instructions are ready to be issued. In an embodiment, the L/S instructions are analyzed from the oldest to the youngest, and each instruction is identified as either ready to issue or not. In an embodiment, the ready to issue can include additional information (for example ready to issue, ready to issue with Inst X, or ready to issue if Inst X does not issue) regarding the issue status of other instructions in the L/S unit. This is important for mergeable and mutually exclusive instructions.

Continuing with the example from above, if at time 6, the processor is able to access memory, it must determine which L/S instruction or instructions it will execute. Thus, it begins evaluating the ready instructions. At the beginning of time 6, the L/S unit looks like this:

Time 6:

| | Ready | 0 | 1 | 2 | 3 | Issue |
|---|---|---|---|---|---|---|
| Ld R8, [R9]$_{I\ 3,B1/1\ (No\ match\ St\ R0,\ match\ St\ R6)}$ | Y | 4.Ld | ME | I | I | C |
| St [R6], R7$_{I\ 3,B1/1\ (no\ match\ Ld\ R4)}$ | Y | 3.St | M | I | ME | |
| Ld R4, [R5]$_{I\ 3,B1/1\ (match\ St\ R0)}$ | Y | 2.Ld | C | I | | |
| St [R2], R3$_{I\ 1,B0/0}$ | Y | 1.St | ME | | | |
| St [R0], R1$_{I\ 3,B0/1}$ | | 0.St | | | | |

In an embodiment, the instructions that are ready to be evaluated in the second L/S unit are evaluated from the oldest to the youngest. Because the first store instruction is not ready to be evaluated, it cannot issue. The processor is able to temporarily modify all the instructions that were mutually exclusive with the first instruction to indicate that they are now independent of the first store instruction. Thus, the second store instruction and the second load instruction can now issue, assuming no other instructions block them.

Next, the second store instruction is evaluated. The second store is ready to be evaluated. It is mutually exclusive with regard to the first store. Because the first store is not issuing, the status can be temporarily modified to Independent. Modifications to the status are temporary and all status changes are backed out when the cycle is over. There are no other state determinations to be evaluated, so the second store can be marked as ready to Issue.

Time 6:

| | Ready | 0 | 1 | 2 | 3 | Issue |
|---|---|---|---|---|---|---|
| Ld R8, [R9]$_{I\ 3,B1/1\ (No\ match\ St\ R0,\ match\ St\ R6)}$ | Y | 4.Ld | ME > I | I | I | C |
| St [R6], R7$_{I\ 3,B1/1\ (no\ match\ Ld\ R4)}$ | Y | 3.St | M | I | ME | |
| Ld R4, [R5]$_{I\ 3,B1/1\ (match\ St\ R0)}$ | Y | 2.Ld | C | I | | |
| St [R2], R3$_{I\ 1,B0/0}$ | Y | 1.St | ME > I | | | Y |
| St [R0], R1$_{I\ 3,B0/1}$ | | 0.St | | | | |

Next, the first load instruction is evaluated. The first load instruction is ready to be evaluated. It clashes with regard to the first store. Because the first store has not issued yet, this load cannot issue. The first load is independent of the second store instruction. But, it cannot issue until after the first store instruction issues. Thus, it is not ready to issue.

Next, the third store instruction is evaluated. The third store instruction is ready to be evaluated. It can be merged with the first store instruction. Thus, it could issue with or after the first store instruction, but because the first store instruction has not issued yet, and will not issue this cycle, the third store instruction also cannot issue. This is the case, even though it is independent of the second store instruction and mutually exclusive of the first load instruction that is not ready to issue. Thus, the third store instruction is not ready to issue.

Next, the second load instruction is evaluated. The second load instruction is ready to be evaluated. It is mutually exclusive of the first store instruction. The first store instruction is not ready to issue, so there is no conflict with the first store instruction. The second load instruction can execute independent of the second store instruction and the first load instruction so there is also no conflicts with either of these instructions. But the second load instruction reads from the same index and same bank as the third store instruction writes to, and there is a portion of the load that overlaps with the store, so the instructions clash. The second load instruction cannot issue until after the third store instruction.

Next, having completed the evaluation, the processor can select an instruction to issue. In this case, the only instruction that is ready to issue is the second store instruction, and thus, it issues.

Continuing with the example from above, if at time 7, the processor is able to access memory, it must determine which L/S instruction or instructions it will execute. At this point the first store instruction is no longer speculative and is ready to be evaluated. At the beginning of time 6, the L/S unit looks like this:

Time 6:

| | Ready | 0 | 1 | 2 | 3 | Issue |
|---|---|---|---|---|---|---|
| Ld R8, [R9]$_{I\ 3,B1/1\ (No\ match\ St\ R0,\ match\ St\ R6)}$ | Y | 4.Ld | ME > I | I | I | C |
| St [R6], R7$_{I\ 3,B1/1\ (no\ match\ Ld\ R4)}$ | Y | 3.St | M | I | ME > I | |
| Ld R4, [R5]$_{I\ 3,B1/1\ (match\ St\ R0)}$ | Y | 2.Ld | C | I | | |
| St [R2], R3$_{I\ 1,B0/0}$ | Y | 1.St | ME > I | | | Y |
| St [R0], R1$_{I\ 3,B0/1}$ | | 0.St | | | | |

Time 7:

| | | | 0 | 1 | 2 | 3 | Issue |
|---|---|---|---|---|---|---|---|
| Ld R8, [R9]$_{I-3,T1/1}$ (No match St R0, match St R6) | Ready | | | | | | |
| St [R6], R7$_{I-3,T1/1}$ (no match Ld R4) | Y | 3.Ld | ME | I | C | | |
| Ld R4, [R5]$_{I-3,T1/1}$ (match St R0) | Y | 2.St | M | ME | | | |
| St [R0], R1$_{I-3,T0/1}$ | Y | 1.Ld | C | | | | |
| | Y | 0.St | | | | | |

At this point, the first store instruction is ready to be evaluated. Because there are no older instructions with which it can conflict, it is ready to issue. The processor is able to temporarily modify all the instructions that were mergeable with the first instruction to indicate that they are now independent of the first store instruction, i.e., they can execute with the first instruction assuming there are no other conflicts. Thus, the second store instruction is modified to indicate that it is independent of the first store instruction.

Time 7:

| | | | 0 | 1 | 2 | 3 | Issue |
|---|---|---|---|---|---|---|---|
| Ld R8, [R9]$_{I-3,T1/1}$ (No match St R0, match St R6) | Ready | | | | | | |
| St [R6], R7$_{I-3,T1/1}$ (no match Ld R4) | Y | 3.Ld | ME | I | C | | |
| Ld R4, [R5]$_{I-3,T1/1}$ (match St R0) | Y | 2.St | M > I | ME | | | |
| St [R0], R1$_{I-3,T0/1}$ | Y | 1.Ld | C | | | | |
| | Y | 0.St | | | | | Y |

Next, the first load instruction is ready to be evaluated. Because if conflicts with the first store instruction it cannot issue until the first store instruction has issued. Thus, it is not ready to issue. The processor is able to temporarily modify all the instructions that were mutually exclusive of the first load instruction to indicate that they are now independent of the first store instruction, i.e., they can execute since the first load instruction is not executing assuming there are no other conflicts. Thus, the second store instruction is modified to indicate that it is independent of the first load instruction.

Next, the second store instruction is ready to be evaluated. Due to the state changes discussed above, the second store machine can issue, assuming that the first store instruction issues. This is because the state initially indicated that they were mergeable, i.e., the second store can either issue after or with the first store instruction.

Last, the second load instruction is ready to be evaluated. Because it is mutually exclusive of the first instruction and the first instruction is ready to issue, it cannot issue. In addition, the second load instruction clashes with the second store instruction, so it cannot issue until after the second store instruction.

At this point all pending instructions in the L/S queue have been evaluated. The two store instructions are ready to issue. Depending on the implementation of the memory system, one or more L/S instructions can execute at this point. For example, the memory system can be designed to handle only one L/S instruction per cycle, multiple L/S instructions per cycle, or some combination of load and store instructions (e.g., 1 load instruction and 2 store instructions each cycle.)

Time 7:

| | | | 0 | 1 | 2 | 3 | Issue |
|---|---|---|---|---|---|---|---|
| Ld R8, [R9]$_{I-3,T1/1}$ (No match St R0, match St R6) | Ready | | | | | | |
| St [R6], R7$_{I-3,T1/1}$ (no match Ld R4) | Y | 3.Ld | ME | I | C | | |
| Ld R4, [R5]$_{I-3,T1/1}$ (match St R0) | Y | 2.St | M > I | ME > I | | | Y |
| St [R0], R1$_{I-3,T0/1}$ | Y | 1.Ld | C | | | | |
| | Y | 0.St | | | | | Y |

In this illustrative example, the memory system has been designed to handle 2 L/S instructions per cycle. This could be 2 load instructions, 2 store instructions, or 1 load and 1 store instruction. Having identified that both store instructions can be issued, the processor may issue both of them this cycle. In an embodiment, once an instruction is issued it may be removed from the L/S unit, all dependencies related to this instruction may be changed to independent, and the remainder of the state table may stay the same. In an embodiment, the state table may remain the same until it a L/S instruction is put in its last entry, at which time it may consolidate the table to remove entries that have issued. In an embodiment, once an instruction is issued, not only will it be removed, but all remaining entries in the table can be shifted accordingly.

In this example, the state table is collapsed each time a L/S instruction is issued. At the beginning of time 8, having issued the store instructions, the state table may look like:

Time 8:

| | | | 0 | 1 | 2 | 3 | Issue |
|---|---|---|---|---|---|---|---|
| Ld R8, [R9]$_{I-3,T1/1}$ | Ready | | | | | | |
| Ld R4, [R5]$_{I-3,T1/1}$ | Y | 1.Ld | I | | | | |
| | Y | 0.Ld | | | | | |

At this point, if additional L/S instructions are ready to be evaluated they can be moved to the L/S unit and the state table can be updated as described above. If the processor is able to access memory, then these two load instructions may issue (i.e., both are ready to issue, and the second load can execute independent of the first load instruction, so both would be ready to issue).

Resource Locking Structure

Figure 4:
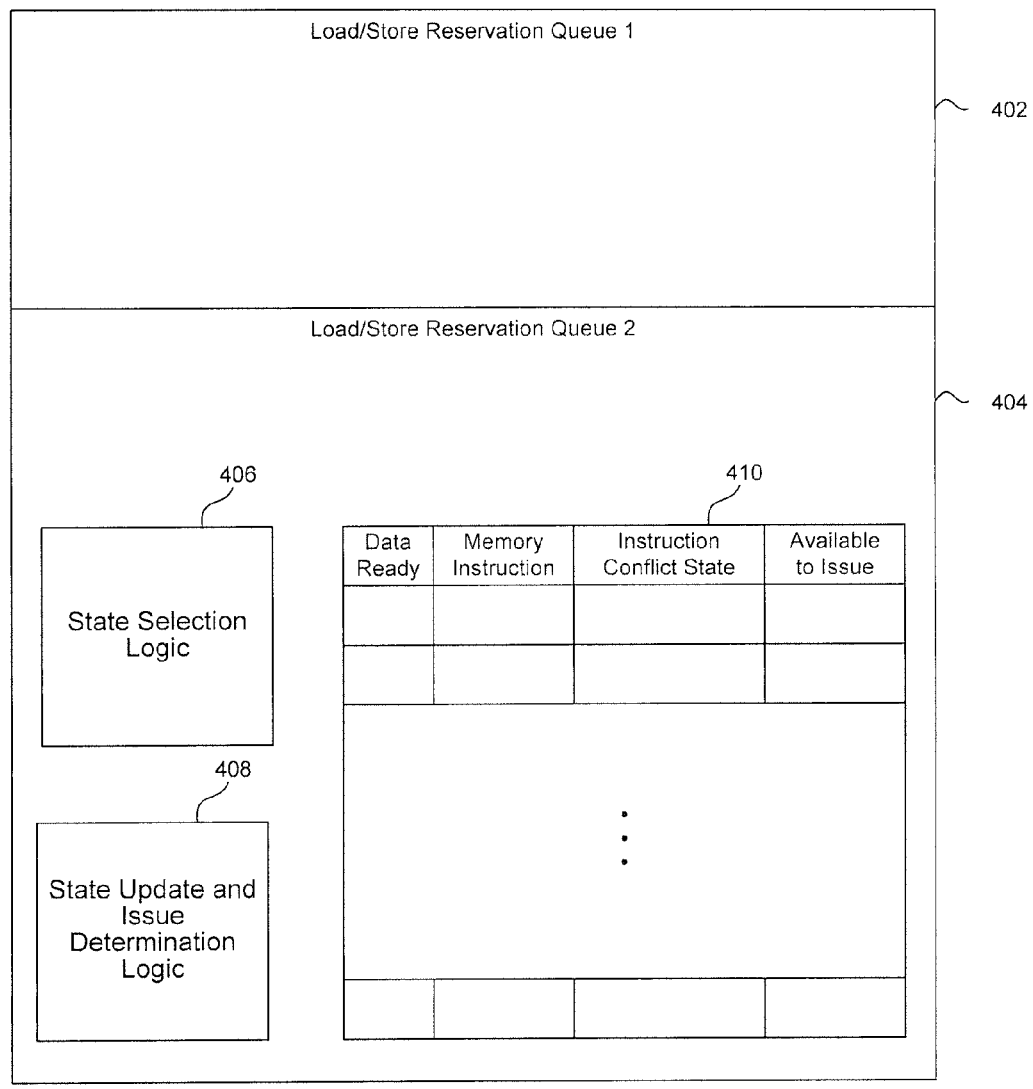
FIG. 4 is a high-level block diagram of an exemplary processor with resource locking.

Referring to FIG. 4, an exemplary embodiment of a Load/Store (L/S) Queue includes a L/S Reservation Queue 1 402 and a L/S Reservation Queue 2 404.

L/S Reservation Queue 1 402 can be the first portion of the L/S unit described above. When a L/S instruction is fetched, it is first placed in L/S Reservation Queue 1 402. Once the L/S instruction's operands are resolved it can be placed in L/S Reservation Queue 2 404. Load instructions take data from a location in memory and load it to a destination, typically a register. Thus, for load instructions, all that needs to be resolved is the location in memory. For store instructions, a value, typically stored in a register, is stored to a memory location. Thus, for a store instruction to be moved to L/S Reservation Queue 2 404 both the value to be stored and the location where the value is to be stored must be resolved.

L/S Reservation Queue 2 404 can be the second portion of the L/S unit described above. L/S Reservation Queue 2 404 includes a State Selection Logic 406, State Update and Issue Determination Logic 408, and L/S Instruction State Queue 410. As described above, when a L/S instruction is received into L/S Reservation Queue 2 404 it is placed in L/S Instruction State Queue 410.

In an embodiment, when the L/S instruction is placed in L/S Instruction State Queue 410, State Selection Logic 406 determines the initial state of the instruction in view of all other L/S instructions currently pending in L/S Reservation Queue 2 404. As described above, in an embodiment, State Selection Logic 406 sets that initial state of each L/S instruction. State Selection Logic 406 indicates whether store instructions are speculative or not. For those store instructions that are speculative, State Selection Logic 406 puts them into L/S Instruction State Queue 410 but sets the Data Ready state to "No." For all other L/S instructions, State Selection Logic 406 sets the Data Ready state to "Yes." As described above, State Selection Logic 406 also sets the initial Instruction Conflict State. This state allows State Update and Issue Determination Logic 408 to determine whether an instruction can issue based on the memory read from and written to by previous L/S instructions.

In an embodiment, State Update and Issue Determination Logic 408 determines whether instructions are ready to issue, selects instructions to issue, and updates L/S Instruction State Queue 410 when instructions issue. As described above, when a L/S instruction's operands are ready, State Update and Issue Determination Logic 408 analyzes the Instruction Conflict State and the issue status of prior L/S instructions to determine if the L/S instruction is ready to issue. Once all instructions in L/S Reservation Queue 2 404 have been analyzed, State Update and Issue Determination Logic 408 selects instructions to be issued. It may prefer to issue older instructions rather than newer instructions, store instructions rather than load instructions, instructions that read from or write to specific areas in memory, etc.

In an embodiment, L/S Instruction State Queue 410 maintains the state of all L/S instructions in L/S Reservation Queue 2 404. In an embodiment, L/S Instruction State Queue 410 comprises a Data Ready indicator that indicated whether or not the instruction can execute. For example, store instructions that are speculatively fetched cannot issue. Because they affect memory, issuing a store instruction cannot easily be backed out. Thus, these instructions will be maintained in L/S Instruction State Queue 410 until they are no longer speculative. In an embodiment, L/S Instruction State Queue 410 comprises the Memory Instruction itself or a pointer to the memory instruction. This allows the processor to issue the instruction once it is ready. In an embodiment, L/S Instruction State Queue 410 comprises the Instruction Conflict State that maintains the relation between L/S instructions. In an embodiment, once the Instruction Conflict State is set for any given instruction it can be maintained until that instruction issues. Thus, it does not need to be recalculated each time the processor has access to the memory. In an embodiment, L/S Instruction State Queue 410 comprises an Available to Issue indication. This indication allows L/S Reservation Queue 2 404 to track which instructions are available to issue each cycle. Thus, once the processor has access to the memory it may select one or more L/S instructions to execute.

State Selection Process

In an exemplary embodiment, the L/S unit can be configured to determine the relation between a new L/S instruction and all pending L/S instructions.

Figure 5:
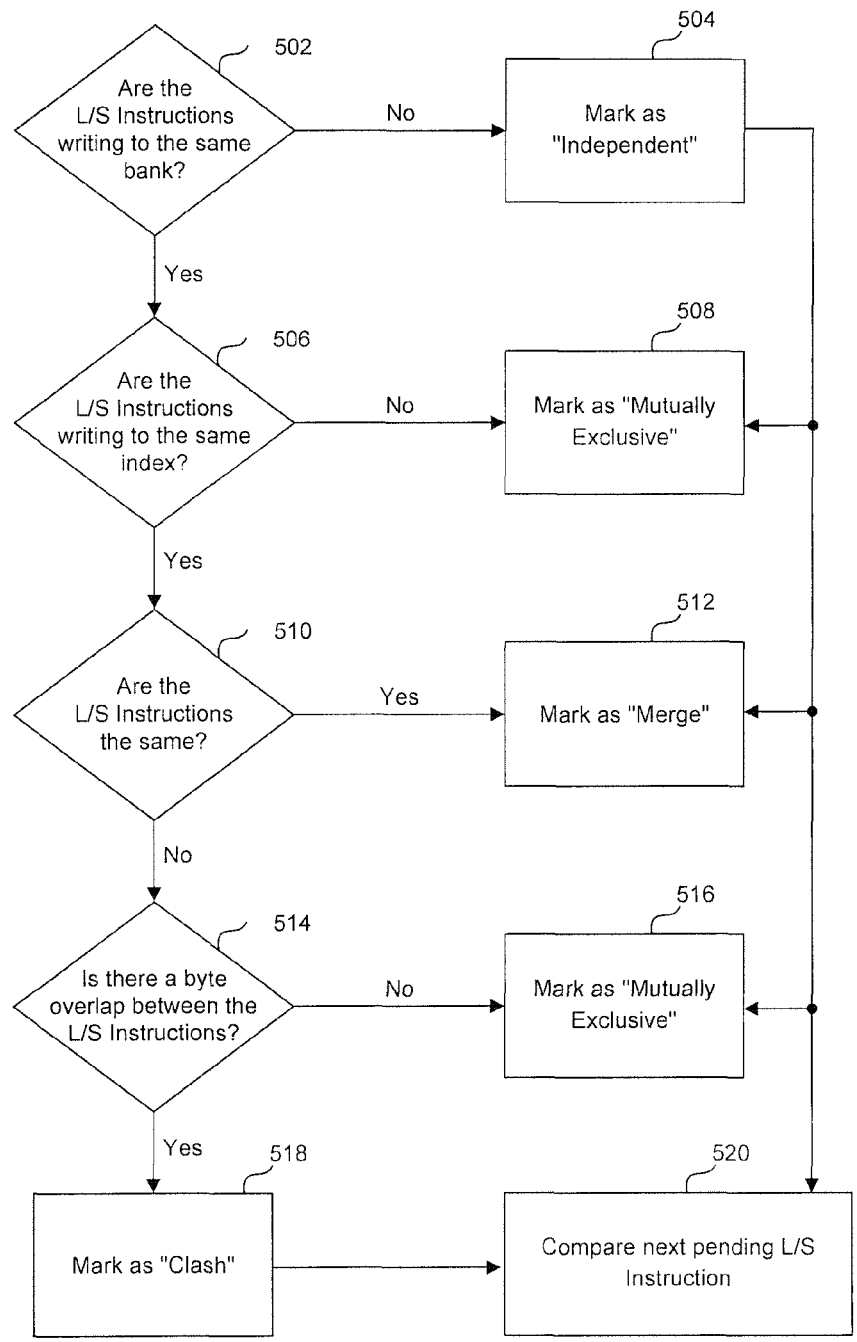
FIG. 5 is flowchart illustrating a state determination process, according to an example embodiment.

The process illustrated in FIG. 5 describes how the L/S unit compares the new L/S instruction with a pending L/S instruction.

At step 502, the L/S unit determines if the new L/S instruction writes to the same block as the pending L/S instruction.

If not, the instructions are independent, as described above, and the process moves on to step 504. At step 504, the L/S unit sets the state relating to the new L/S instruction and the pending L/S instruction to "independent" and continued to step 520.

If the new L/S instruction and the pending L/S instruction write to the same block, then the process moves on to step 506. At step 506, the L/S unit determines if the new L/S instruction is writing to the same index as the pending L/S instruction.

If not, the instructions are mutually exclusive, as described above, and the process moves on to step 508. At step 508, the L/S unit sets the state relating to the new L/S instruction and the pending L/S instruction to "mutually exclusive" and continued to step 520.

If the new L/S instruction and the pending L/S instruction write to the same index, then the process moves on to step 510. At step 510, the L/S unit determines if the new L/S instruction and the pending L/S instruction are the same type of operation, i.e., are they both load instructions or are they both store instructions.

If so, the instructions can be merged, as described above, and the process moves on to step 512. At step 512, the L/S unit sets the state relating to the new L/S instruction and the pending L/S instruction to "mergeable" and continued to step 520.

If the new L/S instruction and the pending L/S instruction are different types of operations, i.e., one is a load instruction and the other is a store instruction, then the process moves on to step 514. At step 514, the L/S unit determines if the new L/S instruction and the pending L/S instruction access at least one overlapping byte, i.e., both operations access the same bits of storage in the memory.

If not, the instructions are mutually exclusive, as described above, and the process moves on to step 518. At step 516, the L/S unit sets the state relating to the new L/S instruction and the pending L/S instruction to "mutually exclusive" and continued to step 520.

If so, the instructions clash, as described above, and the process moves on to step 518. At step 518, the L/S unit sets the state relating to the new L/S instruction and the pending L/S instruction to "clash" and continued to step 520.

At step 520, the next pending L/S instruction is selected and the process can begin again to determine the state relating to the new L/S instruction and new newly selected pending L/S instruction.

State Update and Issue Process

In an exemplary embodiment, the L/S unit can be configured to update the state relations between the pending L/S instructions and identify L/S instructions that are ready to issue.

Figure 6:
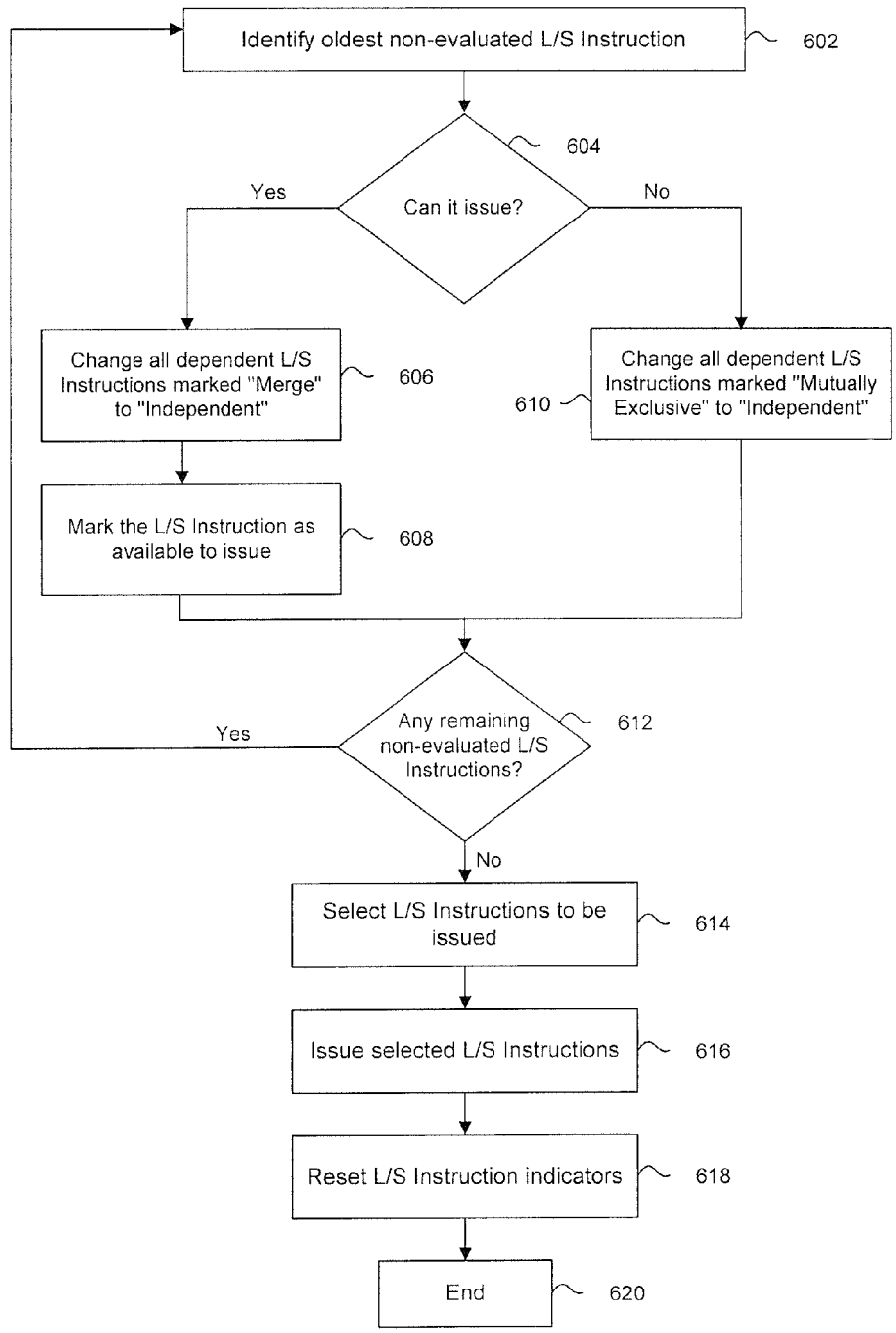
FIG. 6 is flowchart illustrating an instruction state update process, according to an example embodiment.

The process illustrated in FIG. 6 describes how the L/S unit updates the state relations and identifies instructions that are ready to be issued.

At step 602, the L/S unit identifies the oldest non-evaluated L/S instruction and begins evaluating it.

At step 604, the L/S unit determines if this instruction is ready to be issued. If the L/S instruction is a store instruction that is still speculative, then it is not ready to be issued. If any instruction conflict state associated with the L/S instruction is not currently set to "Independent" then the L/S instruction is not ready to issue. Otherwise this L/S instruction is ready to issue.

If the L/S instruction is ready to issue, then the process moves on to step 606. At step 606, the states for all younger instructions related to this instruction are identified. If any of the younger instruction states are currently set to "Merge," that state is temporarily set to "Independent." This is because the current L/S instruction is ready to issue and the younger L/S instruction indicated that it could issue if the current L/S instruction issued.

At step 608, the current L/S instruction is marked as ready to issue. The process then continues on to step 612.

If the current L/S instruction is not ready to issue, then the process moves on to step 610. At step 610, the state for all younger instructions that is related to this instruction are identified. If any of the younger instruction state is currently set to "Mutually Exclusive," the state is temporarily set to "Independent." This is because the current L/S instruction is not ready to issue and the younger L/S instruction indicated that it could issue if the current L/S instruction does not issue. The process then continues on to step 612.

At step 612, if there are any remaining L/S instructions to be evaluated, the process returns to step 602 to evaluate the remaining L/S instructions. Otherwise, the process continues to step 614.

At step 614, L/S instructions that are ready to be issued are selected. In an embodiment, the selection is based on the age of the L/S instruction, for example selecting older instructions first. In an embodiment, the selection is based on the type of L/S instruction, for example preferring to issue store instructions over load instructions. In an embodiment, the selection of instructions can be based on the design of the processor, for example factoring in the load and store bandwidth. A person skilled in the art would understand that other selection methods could be used.

At step 616, the selected L/S instructions are issued.

At step 618, the instruction conflict state for all the instructions in the L/S unit is reset back to what it was before this process started, and the process ends at step 620.

Stunt Box

In a scalar processor design, each instruction is fetched, decoded, executed, and retired in order. When retired the results of executed instructions update the register file to be used by future instructions. An instruction can be fetched in parallel with another instruction is decoded, another instruction being executed, and another instruction being retired. Each of these portions of the processor can be called a stage. The speed of the processor can then be estimated by the longest time it takes an instruction to complete a stage. Thus, if the execution stage is the longest stage, and it takes 1 second to complete that stage, then the execution time of a program can be estimated by the number of instructions required to run it, i.e., if the program is 60 instructions long, then the estimated time to complete the program would be 1 minute. Thus, in order to increase the speed at which the processor can run, one or more of these stages can be broken up into smaller sections. But this estimate may be incorrect because certain instructions may need to wait for other instruction to complete before they can be executed. Thus, results from an instruction in one stage, for example at the end of the execution stage, can be forwarded to other stages.

Superscalar processors take these concepts one step further. Rather than just fetching, decoding, executing, and retiring one instruction, they implement multiple parallel pipelines allowing them to handle multiple instructions at the same time. Thus, a superscalar processor can be designed to fetch, decode, execute, and retire 2, 4, 8, or more instructions at the same time. But the number of pipelines a superscalar processor can implement is limited by the design requirement of the processor. For example, the register file, which will store the results of most of the instructions within a program, may only be able to be designed to handle a limited number of writes given space and wiring limitations.

A stunt box provides a way to increase the number of parallel pipelines without requiring an equivalent increase in the register files ability to accept new data. As illustrated in FIG. 1, the stunt box receives results from all of the execution pipelines. The stunt box can also provide one or more of the results to the remainder of the machine. Results that are received from the execution pipeline and not provided to the rest of the machine are retained, to be provided to the machine at a later time. This provides many benefits. First, it allows a processor to have more parallel pipelines than the number of results that can be retired in a single clock cycle. Second, it allows the processor to proceed at full bandwidth for a longer period of time before having to stall because it is not able to retire results as fast as it is able to create them. For example, if the stunt box can hold 20 addition results, then the processor can continue to run through a program, where certain parts of the program are execution intensive, and reduce the amount of time the program would stall due to retirement congestion. When more results are being created than can be retired, the additional results can be stored in the stunt box without slowing down the machine. When fewer results are being created than can be retired, the processor can empty out the stunt box without slowing down the machine. This can be seen by the example below:

Code to be executed:
4 add instructions
4 store instructions
4 add instructions
4 store instructions

| | Processor without a stunt box that can fetch 4 instructions and retire 2 results each cycle | | Processor with a stunt box that can fetch 4 instructions and retire 2 results each cycle | | |
|---|---|---|---|---|---|
| Cycle | Inst Retired | Results retired | Inst Retired | Results retired | Results in the storage |
| 1 | 2 add | 2 | 4 add | 2 | 2 |
| 2 | 2 add | 2 | 4 store | 2 | 0 |
| 3 | 4 store | 0 | 4 add | 2 | 2 |
| 4 | 2 add | 2 | 4 store | 2 | 0 |
| 5 | 2 add | 2 | | | |
| 6 | 4 store | 0 | | | |

In the above example, where both processors can fetch 4 instructions and retire 2 instructions each cycle, the processor with the stunt box can finish the code fragment quicker. For simplicity sake, we will assume that all of the instructions above are independent and do not cause and other stalls within the processor. The processor without the stunt box can only execute 2 add instructions at a time because it can only retire 2 results each cycle. The processor with the stunt box can execute all 4 add instructions each time. It retires 2 of the results immediately, and retires the two remaining results while the store instructions are being executed. Below is a longer example that more clearly shows the examples of using a stunt box. Even though 4 add instructions can be fetched, since only 2 results can be retired during any clock cycle, only 2 of the add instructions can retire.

Code to be executed:
4 add instructions
4 add instructions
4 add instructions
4 add instructions
4 add instructions
4 add instructions
4 store instructions
4 store instructions
4 store instructions
4 store instructions
4 store instructions
4 store instructions

| Processor without a stunt box that can fetch 4 instructions and retire 2 results each cycle | | Processor with a stunt box that can fetch 4 instructions and retire 2 results each cycle | | |
| --- | --- | --- | --- | --- |
| Cycle | Inst Retired | Results retired | Inst Retired | Results retired | Results in the storage |

| Cycle | Inst Retired | Results retired | Inst Retired | Results retired | Results in the storage |
| --- | --- | --- | --- | --- | --- |
| 1 | 2 add | 2 | 4 add | 2 | 2 |
| 2 | 2 add | 2 | 4 add | 2 | 4 |
| 3 | 2 add | 2 | 4 add | 2 | 6 |
| 4 | 2 add | 2 | 4 add | 2 | 8 |
| 5 | 2 add | 2 | 4 add | 2 | 10 |
| 6 | 2 add | 2 | 4 add | 2 | 12 |
| 7 | 2 add | 2 | 4 store | 2 | 10 |
| 8 | 2 add | 2 | 4 store | 2 | 8 |
| 9 | 2 add | 2 | 4 store | 2 | 6 |
| 10 | 2 add | 2 | 4 store | 2 | 4 |
| 11 | 2 add | 2 | 4 store | 2 | 2 |
| 12 | 2 add | 2 | 4 store | 2 | 0 |
| 13 | 4 store | 0 | | | |
| 14 | 4 store | 0 | | | |
| 15 | 4 store | 0 | | | |
| 16 | 4 store | 0 | | | |
| 17 | 4 store | 0 | | | |
| 18 | 4 store | 0 | | | |

Stunt Box Structure

Figure 7:
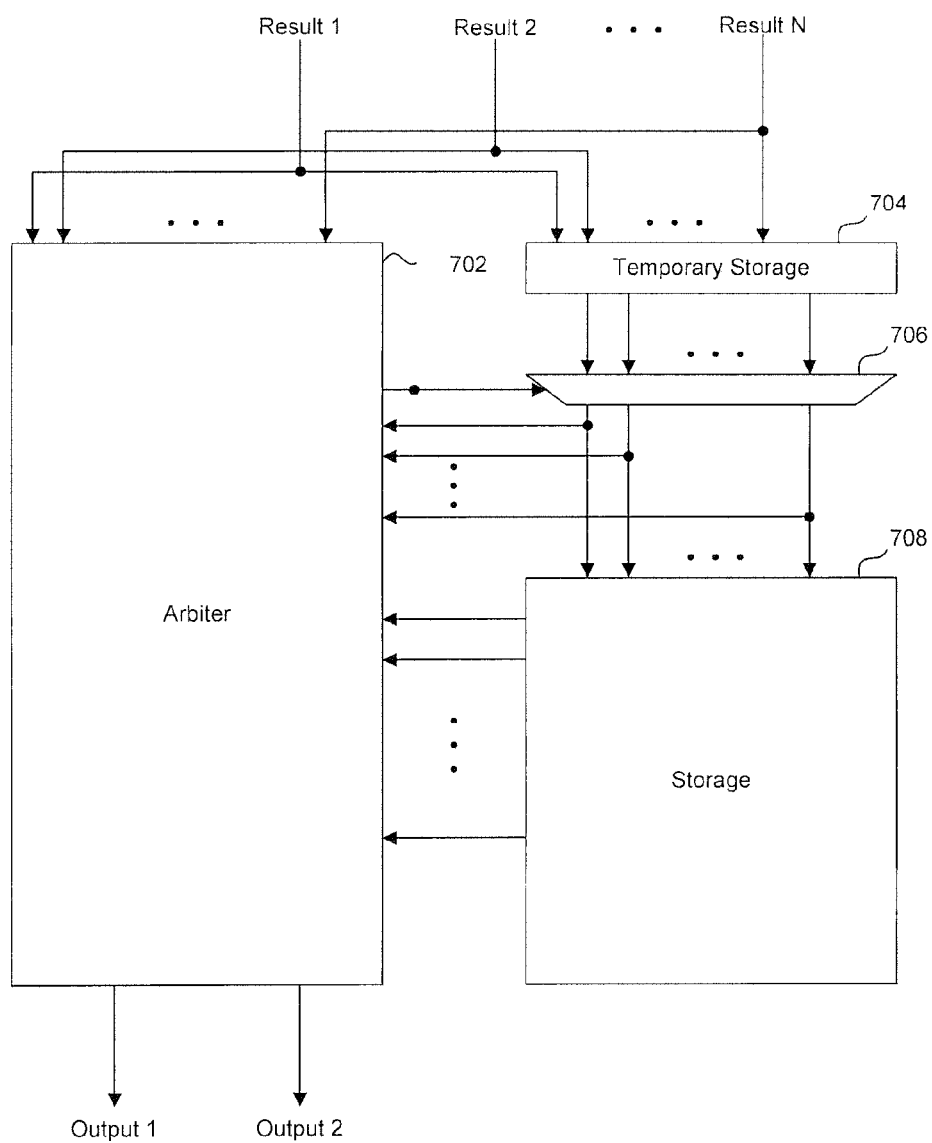
FIG. 7 is a high-level block diagram of an exemplary processor with a stunt box implemented.
Figure 8:
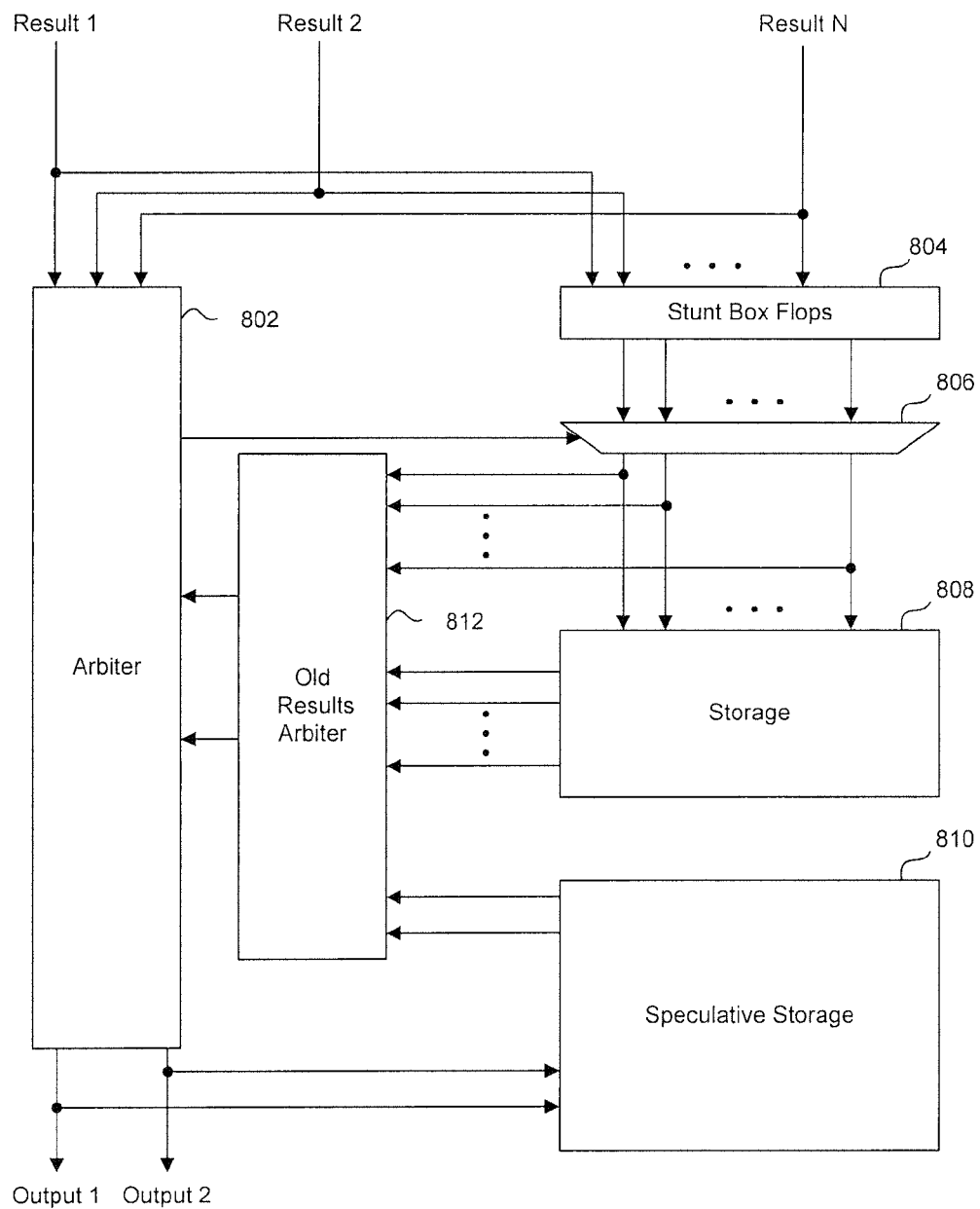
FIG. 8 is a high-level block diagram of another exemplary processor with a stunt box implemented.

FIGS. 7 and 8 illustrate exemplary embodiments of a stunt box

Referring to FIG. 7, an exemplary embodiment of a stunt box can include an arbiter 702, temporary storage 704, a stunt box mux 706, and storage 708.

In an embodiment, results from execution units, for example results 1-N in FIG. 7, are sent to both arbiter 702 and temporary storage 704.

In an embodiment, temporary storage 704 stores the prior results from one cycle of the processor as new results from the next cycle are received. The prior results from temporary storage 704 are provided to stunt box mux 706.

In an embodiment, stunt box mux 706 receives prior results from temporary storage 704 and sends non-retired results to storage 708. As the arbiter determines which results will be retired, as discussed below, the arbiter selects which results from temporary storage 704 should be moved to storage 708. The arbiter can then update the select line of stunt box mux 706 in order to make sure the correct results are sent to storage 708.

In an embodiment, storage 708 receives the selected results from stunt box mux 706, and provides a set of results to arbiter 702. Storage 708 is configured to store results that have not yet been retired.

As discussed above, these results may need to be stored because more results are being generated than can be retired over a given time. In addition, these results may be speculative, and cannot be retired until the processor has confirmed that the associated instruction was supposed to have been fetched. For example, when a conditional branch instruction is encountered, the processor may speculate that the branch is taken, and fetch instructions from the location pointed to by the branch instruction. But the processor cannot retire these instructions until the conditions upon which the branch is conditioned have been determined. Once these have been confirmed, the results of instructions along the speculative path can be retired. But if the speculation was incorrect, these results must be removed without being retired.

In an embodiment, results from the execution units, stunt box mux 706, and storage 708 are received by arbiter 702. Arbiter 702 can be configured to select which results should be retired. For example, the arbiter may choose to retire results in storage 708 before results from stunt box mux 706, and results from stunt box mux 706 before the results from the execution units. This may be because the arbiter prefers to retire older results over newer results. In addition, the arbiter may make decisions on which results to retire based on available retirement resources and result interactions. For example, the stunt box may be configured to retire two results every cycle. In addition, the stunt box may be configured so that one of these results can be a large result (for example 128 bits) and one may be a smaller result (for example 64 bits). In an embodiment, based on the design of the register file, the 128 bits can comprise two consecutive registers. For example, the register file can be configured such that registers R0 and R1 (each of which is 64 bits) can be written to in the same cycle using the single large output. This may be true for all even/odd pairs of consecutive registers, e.g., R0/R1, R2/R3, R4/R5, etc. Thus the arbiter may choose to combine an R0 and R1 results in the large output, even if the R0 was stored in storage 708 and R1 was received from the execution units.

A person skilled in the art would understand that many other variations are possible, depending on the design of the processor, without deviating from this disclosure.

Referring to FIG. 8, an exemplary embodiment of a stunt box can include an arbiter 802, temporary storage 804, a stunt box mux 806, storage 808, speculative storage 810, and old results arbiter 812. Arbiter 802, temporary storage 804, a stunt box mux 806, and storage 808 can perform similarly to arbiter 702, temporary storage 704, a stunt box mux 706, and storage 708, except as indicated below.

In an embodiment, additional speculative storage 810 can be included in the stunt box. One of the issues in storage 808 is the connectivity of all of the results stored in storage 808. Storage 808 can be configured so that any possible combination of stored results can be provided to arbiter 802. As the number of results stored in storage 808 increases, the complexity of selecting results to provide to arbiter 802 increase exponentially.

Speculative storage 810 addresses this concern. Speculative results can be retired twice. First, the speculative results is retired with an indication that it is spill speculative. This allows other speculative instructions to also continue executing using these results. This retirement can be referred to as speculative retirement. Eventually, if the speculative instruction is confirmed, the speculative result is retired again, updating any additional instructions that rely on this result and updating the register file with the, now, non-speculative result. The second retirement of speculative results can be handled a little differently than the first retirement. These results can now be retired in the same order in which they were originally retired. Thus, a first-in-first-out (FIFO) queue can be used rather than increasing the size of the complicated storage 808 to also store speculative instructions that have been speculatively retired.

In an embodiment, storage 808 can be configured to store all results that have not been retired yet, speculative storage 810 can be configured to store all speculatively retired instructions, and arbiter 802 can be configured to select results to be retired from the results received from the execution units, stunt box mux 806, storage 808, and speculative storage 810.

In an embodiment, an old results arbiter 812 can be configured to select one or more results to provide to arbiter 802 from stunt box mux 806 and storage 808. For example, if arbiter 802 can only retire 2 results, old results arbiter 812 can be configured to provide only two results to arbiter 802. As discussed above with regard to arbiter 802, these results may be selected based on age or on the design of the processor. This allows simple logic within arbiter 802 to select the instruction to be retired. Arbiter 802 need only select between the results received from the execution units and the results received from old arbiter 812.

In an embodiment, old results arbiter 812 can also receive results from speculative storage 810.

In an embodiment, arbiter 802 can be configured to quickly retire certain data in order to reduce congestion. In an embodiment, arbiter 802 can comprise a simple data stunt box. The simple data stunt box may be configured to receive certain types of data, for example predicate data, from the execution units and retire this data separate from other results being retired by arbiter 802. In an embodiment, the data handled by the simple data stunt box may be small, for example 8 bits wide. Using the main output of the stunt box, for example the 64 bit and 128 bit outputs described above, for small data can lead to inefficient used of the retirement bandwidth. While this may be mitigated by attempting to combine the small data with larger data, this requires additional logic. By removing this data to the simple data stunt box, the congestion and latency of the main output can be reduced by also reducing the latency of the small data.

Stunt Box Process

In an exemplary embodiment, the stunt box can be configured to determine the results to be retired.

Figure 9:
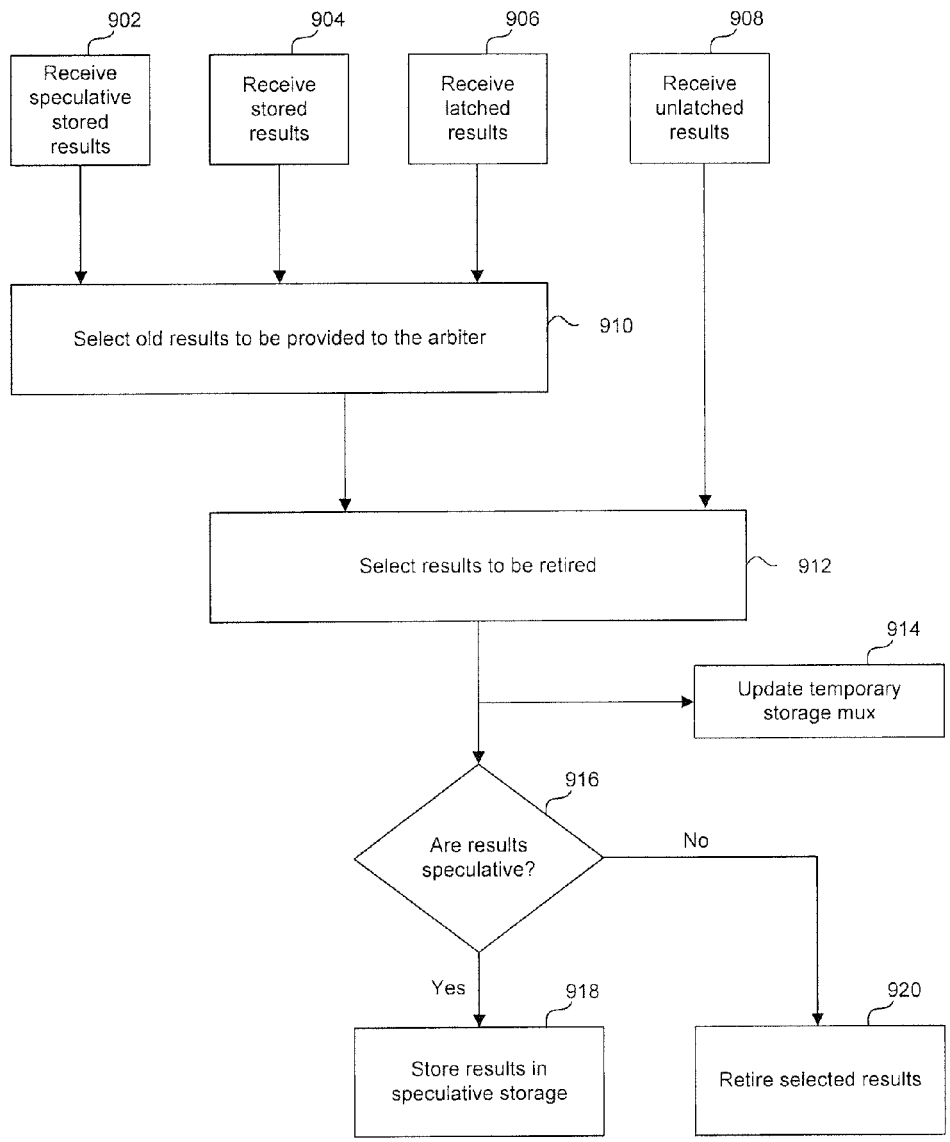
FIG. 9 is flowchart illustrating a result selection process, according to an example embodiment.

The process illustrated in FIG. 9 describes how the L/S unit compares the new L/S instruction with a pending L/S instruction.

Speculative stored results, stored results and latched results are respectively received 902, 904, 906 at the old results arbiter 812; and unlatched results are received at arbiter 802. At step 910, old results are selected and routed to the arbiter 802. At step 912, arbiter 802 selects the results that are to be retired. At step 914 the temporary storage is updated, and at 916 a determination is made as to whether the selected results were speculative. If the determination is affirmative then those results are stored 918 in speculative storage 810; and if the determination is negative then those results are retired 920.

Branch Prediction

Branch instructions are used to choose which path to follow through a program. Branches can be used to jump to a procedure in different places in a program. They can also be used to allow a loop body to be executed repeatedly, and they can be used to execute a piece of code only if some condition is met.

Branches cause problems for processors for two reasons. Branches can change the flow through the program, so the next instruction is not always the instruction following sequentially after the branch. Branches can also be conditional, so it is not known until the branch is executed whether the next instruction to be fetched is the next sequential instruction or the instruction at the branch target address.

In early processor designs, instructions were fetched and executed one at a time. By the time the fetch of a new instruction started, the target address and condition of a previous branch was already known. The processor always knew which instruction to fetch next. However, in pipelined processors, the execution of several instructions is overlapped. In a pipelined processor, the instruction following the branch needs to be fetched before the branch is executed. However, the address of the next instruction to fetch is not yet known. This problem may be referred to as the branch problem. Since the target address and condition of the branch are not known until after the branch is executed, all pipeline stages before the execute stage will be filled with bubbles or no-operations by the time the branch is ready to execute. If an instruction executes in an $n^{th}$ stage of a pipeline, there will be (n−1) bubbles or no-operations per branch. Each of the bubbles or no-operations represents the lost opportunity to execute an instruction.

In superscalar processors, the branch problem is more serious as there are two or more pipelines. For a superscalar processor capable of executing k instructions per cycle, the number of bubbles or no-operations is (n−1)×k. Each bubble still represents the lost opportunity to execute an instruction. The number of cycles lost due to each branch is the same in the pipelined and superscalar processors, but the superscalar processor can do much more in that period of time. For example, consider a 4-issue superscalar (i.e., k=4) processor where branches are executed in the nth pipeline stage (with n=6). If every fifth instruction is a branch instruction, there will be 20 bubbles for every 5 useful instructions executed. Due to the branch problem, only 20% of the execution bandwidth is used to execute instructions. The trend in processor design is towards wider issue and deeper pipelines, which further aggravates the branch problem.

Branch prediction is one way of dealing with the branch problem. A branch predictor predicts whether a branch will be taken or not taken. The predictor uses the prediction to decide what address to fetch the next instruction from in the next cycle. If the branch is predicted as taken, then an instruction at the branch target address will be fetched. If the branch is predicted as not taken, then the next sequential instruction after the branch instruction will be fetched. When a branch predictor is used, a branch penalty is only seen if the branch is mispredicted. A highly accurate branch predictor is therefore an important mechanism for reducing the branch penalty in a processor.

Figure 10:
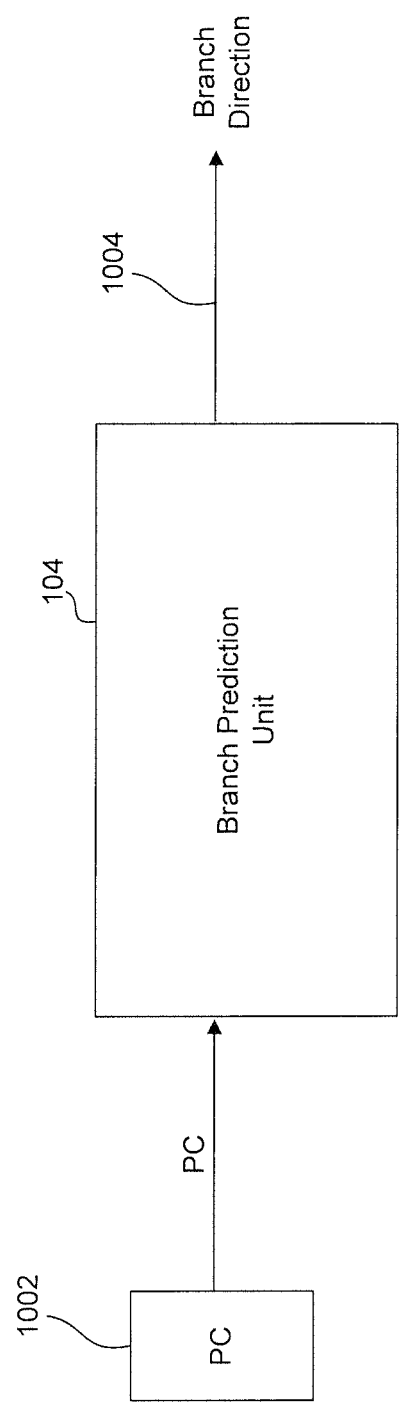
FIG. 10 illustrates an example branch prediction unit according to an embodiment of the disclosure.

FIG. 10 illustrates an example branch prediction unit 104 according to an embodiment of the disclosure. FIG. 10 illustrates a program counter register 1002 coupled to the branch prediction unit. Program counter register 1002 provides a current Program Counter (PC) value. Current PC refers to the value of the program counter (PC) for the instruction currently in a given stage. Each stage of the pipe will have its own version of the current PC. Next PC refers to an address of a next instruction to be fetched from Icache 102. For straight line code the Next PC will be current PC+current instruction width, for redirected code it will be the new target PC. It is to be appreciated that another source besides program counter register 1002 may be used to provide an address of the next instruction to be fetched. Branch prediction unit 104 generates a branch direction signal 1004 based on the Next PC. Branch direction signal 1004 indicates whether a branch will be taken or not taken.

Figure 11:
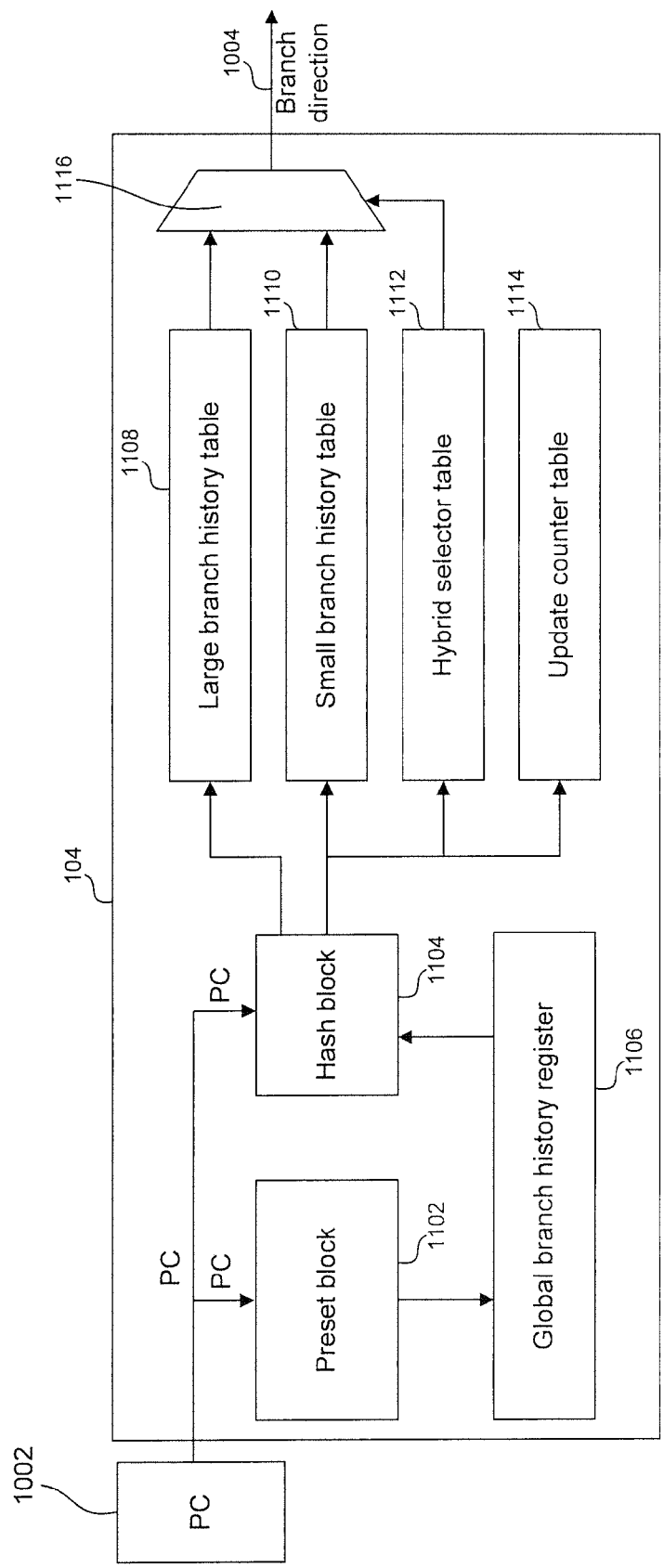
FIG. 11 illustrates the branch prediction unit in further detail according to an embodiment of the disclosure.

FIG. 11 illustrates branch prediction unit 104 in further detail according to an embodiment of the disclosure. Branch prediction unit 104 includes a preset block 1102, a hash block 1104, a global branch history register 1106, a large branch history table 1108, a small branch history table 1110, a hybrid selector table 1112, an update counter table 1114, and a multiplexer (mux) 1116. Preset block 1102 and hash block 1104 are coupled to global branch history register 1106. Hash block 1104 is also coupled to large branch history table 1108, small branch history table 1110, hybrid selector table 1112, and update counter table 1114. Large branch history table 1108, small branch table 1110, and hybrid selector 1112 are coupled to mux 1116.

Global branch history register 1106 stores bits that indicate whether a branch was taken during execution of instructions in a program. Hash block 1104 generates addresses to access entries in the large branch history table 1108, small branch history table 1110, hybrid selector table 1112, and update counter table 1114. Generation of addresses using hash block 1104 to access entries in the large branch history table 1108 is further described below with respect to FIG. 11. Generation of addresses using hash block 1104 to access the entries in the small branch history table 1110, the hybrid selector table 1112, and the update counter table 1114 is further described below with respect to FIG. 15.

A conventional branch predictor may use only one branch history table. Embodiments presented herein use two branch history tables, large branch history table 1108 and small branch history table 1110. Both small branch history table 1110 and large branch history table 1108 store values that predict a branch direction for a branch in a program code being executed. Small branch history table 1110 has fewer entries than large branch history table 1108, and is therefore a shorter history that is better at capturing correlation between branches for which only the most recent branch outcomes are needed. Large branch history table 1108 has more entries than the small branch history table and the longer history captures more complex correlations between branches. The state machine to update values in large branch history table 1108 and small branch history table 1110 is described below with respect to FIG. 16.

Mux 1116 selects between a branch direction read from the large branch history table 1108 and the small branch history table 1110 based on a selection value read from an entry in the hybrid selector table 1112. Each fetched branch is mapped to an entry in large branch history table 1108, small branch history table 1110, and a selection entry in hybrid selector table 1112 using hash block 1104. If the selection entry in the hybrid selector table 1112 has a value greater than or equal to 2, then the prediction from large branch history table 1108 is used to predict the direction of the branch, otherwise, the prediction from small branch history table 1110 is used. A value in a selection entry in hybrid selector table 1112 corresponding to a branch is incremented if only large branch history table 1108 was correct in predicting that branch. If only small branch history table 1110 was correct in predicting that branch, the value in the selection entry in hybrid selector table 1114 corresponding to that branch is decremented. If both large branch history table 1108 and small branch history table 1110 made the same prediction for the branch, the value in the selection entry is not changed.

Update counter table 1114 is used to determine whether to inhibit an update of an entry in large branch history table 1108. Update counter table 1114 stores an update value in each entry. The update value indicates whether large branch history table 1108 or small branch history table 1110 is more accurate in a prediction of a particular branch. According to an embodiment of the disclosure, the value in a large branch history table 1108 corresponding to a branch instruction is not updated if the corresponding update value in update counter table 1114 indicates that the small branch history table 1110 is more accurate than large branch history table 1108 in a prediction of a branch direction for the branch. If an update value corresponding to a particular branch in update counter table 1114 is zero, then update of large branch history table 1108 is inhibited regardless of whether the particular branch is correctly predicted by large branch history table 1108 or small branch history table 1110, otherwise the update is allowed. When small branch history table 1110 mispredicts a particular branch, the update value corresponding to the particular branch in update counter table 1114 is set to 11. Every time thereafter, the update value corresponding to that particular branch is decremented if large branch history table 1108 mispredicts the particular branch. In this manner, large branch history table 1108 is only updated with the correct prediction for the particular branch when small branch history table 1108 has recently mispredicted the particular branch. This prevents over-updating of large branch history table 1108 leading to better training of large branch history table 1108 with regard to the particular branch.

Figure 12:
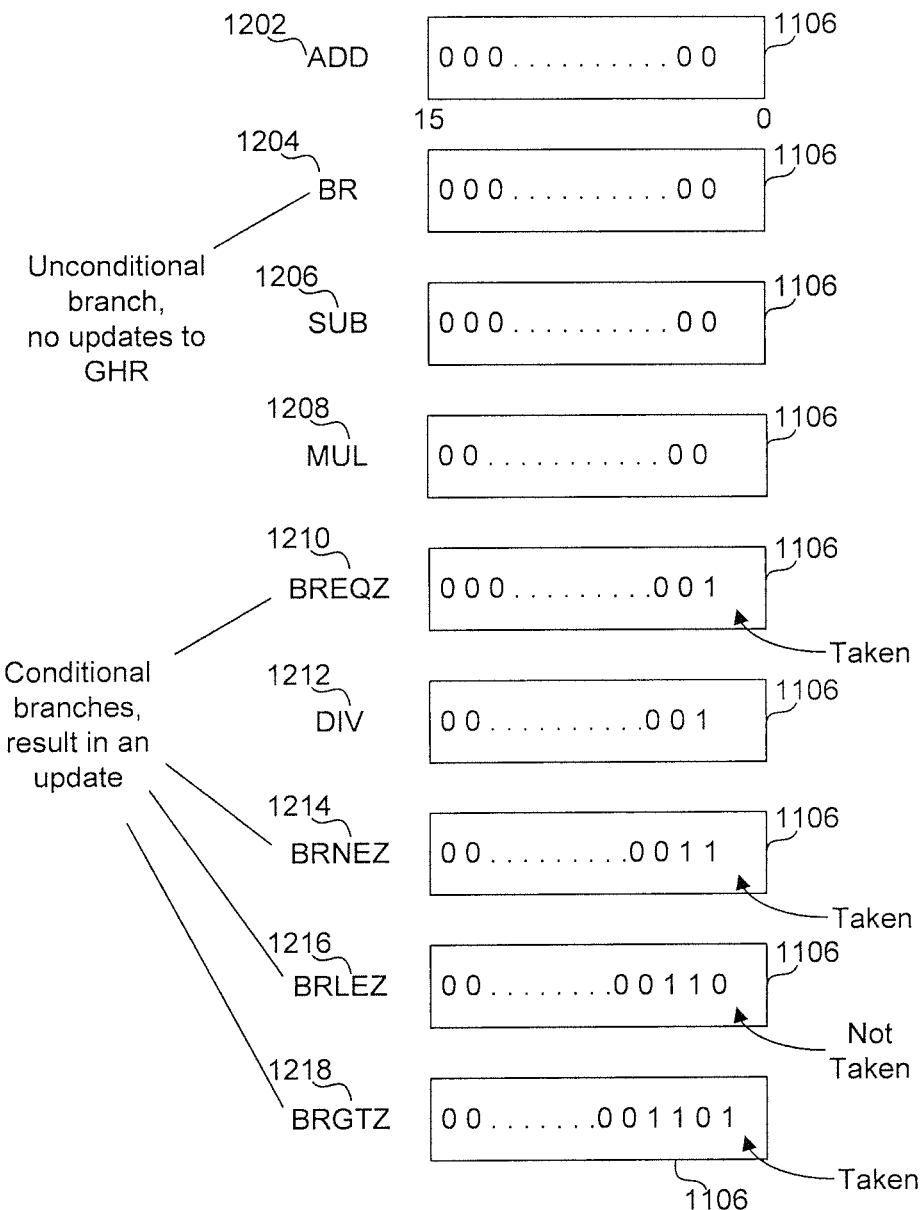
FIG. 12 illustrates example updates of a global branch history register according to an embodiment of the disclosure.

FIG. 12 illustrates an example to update global branch history register 1106 according to an embodiment of the disclosure. FIG. 12 shows different instructions and the resulting updates in global branch history register 1106 when the instructions are fetched. In an example, global branch history register 1106 may be initialized to store all zeros upon startup. In another example, global branch history register may store a random value upon startup. Global branch history register 1106 is updated only for conditional branch instructions. A conditional branch instruction is, for example, a branch instruction that jumps to an address based on whether a condition is true or false. A branch if equal to zero (BREQZ) instruction, a branch if not equal to zero (BRNEZ) instruction, a branch if less than or equal to zero instruction (BRLEZ), and a branch if greater than zero (BRGTZ) instruction are examples of conditional branch instructions. Unconditional branch instructions are branch instructions that always transition program execution to an address of an instruction specified in the branch instruction. For example, BR X is an unconditional branch instruction that will transition program execution to an instruction stored at address X. Global branch history register 1106 is also not updated for instructions that are not conditional branches such as addition (ADD) instructions, subtract (SUB) instructions, multiply (MUL) instructions, divide (DIV) instruction, load (LD), or store (ST) instructions. When an instruction, for example, an ADD instruction 402 is fetched, there will be no change made to global branch history register 1106 since it is not a conditional branch instruction. Therefore, fetching of any arithmetic, load, store, or unconditional branch instruction will not update global branch history register 1106.

Referring back to FIG. 12, upon receiving BR instruction 1204, global branch history register 1106 is not updated because BR instruction 1204 is not a conditional branch instruction. When SUB instruction 1206 and MUL instruction 1208 are fetched, global branch history register 1106 is not updated. Upon receiving a conditional branch instruction BREQZ 1210, global branch history register 1106 will be updated. In this example, assuming BREQZ instruction 1210 is predicted as being taken, then global branch history register 1106 is updated by shifting a bit "1" into the least significant bit position of global branch history register 1106 to indicate that it is taken. In an embodiment, if the prediction is determined to be incorrect when the BREQZ instruction 1210 is later resolved by executing it in branch unit 118, then global branch history register 1106 is updated with the correct prediction of the BREQZ instruction 1210.

Upon fetching DIV instruction 1212, global branch history register 1106 is not updated since DIV 1212 instruction is not a conditional branch instruction. Upon receiving BRNEZ instruction 1214, global branch history register 1106 will be updated since BRNEZ instruction 1214 is a conditional branch instruction. Assuming BRNEZ instruction 1214 is predicted as taken, global branch history register 1106 is updated by shifting a bit "1" into the least significant bit position of global branch history register 1106 as shown in FIG. 12. BRLEZ instruction 1216 causes an update of global branch history register 1106 since it is a conditional branch instruction. Assuming that BRLEZ instruction 1216 is not taken, a bit "0" will be shifted into global branch history register 1106 at its least significant bit position. For the next instruction, branch greater than zero (BRGTZ) 1218, global branch history register 1106 will again be updated. Assuming that branch greater than zero 1218 is taken, a one will be shifted into the least significant bit position of global branch history register 1106.

A program may include multiple procedures. A procedure is a section of code within the program that is accessed upon execution of a "call" instruction. The call instruction may include an instruction that returns program execution to a next instruction after the call instruction. An example of a call instruction is a "branch with link" instruction that is further described with reference to the example program code provided below:

---

PROGRAM CODE:
    0x001 ADD
    0x002 SUB
    0x003 BR
    0x004 BRNEZ
    0x005 MUL
    0x006 ADD
    0x007 BRANCH WITH LINK TO PROCEDURE 1

-continued

```
        0x008 BRLEZ
        0x009 BRGTZ
        0x010 ADD
        0x011 BRANCH WITH LINK TO PROCEDURE 2
        0x012 ADD
PROCEDURE 1
        0x014 ADD
        0x015 SUB
        0x016 BREOZ
        0x017 BRNEZ
        0x018 MUL
        0x019 DIV
END PROCEDURE 1
        0x021 ADD
        0x022 MUL
PROCEDURE 2
        0x024 SUB
        0x025 MUL
        0x026 ADD
        0x027 BREQZ
        0x028 MUL
        0x030 BRGTZ
END PROCEDURE 2
```

In the example program code above, 0xXXX represents the address at which an instruction is stored in instruction cache 102. A branch with link instruction is an instruction that transfers program execution to a particular procedure in the program code. Executing the branch with link instruction that transfers program execution to a procedure is referred to as "calling a procedure" herein. The branch with link instruction includes an instruction (not shown) that returns program execution to a next instruction after the branch with link instruction.

Global branch history such as that stored in global branch history register 1106 is used as an index to access prediction entries in large branch history table 1108 and small branch history table 1110 because branches often correlate with previously executed branches. Longer branch histories enable predictors to view a larger window of previously executed branches and learn based on correlations with those branches. For branches highly correlated with recent branch history, global history can provide key prediction information. Conventional branch predictors may rely only on a global branch history to produce branch predictions. However, not all branches in the program are correlated with recently executed branches. For these branches that are not correlated with recently executed branches, the extra information encoded in the global history may do more harm than good when predicting branches. It also increases the time to train the branch predictor and it significantly expands the level of aliasing in branch prediction tables, thereby reducing the accuracy of prediction of a current branch and of other branches. A longer global branch history register 1106 enables correlation between more distant branches, but also increases the number of uncorrelated branches that are included in the branch history. Those uncorrelated branches can generate significant noise when predicting branches. Consider a 15-bit global branch history register 1106. A branch that is highly correlated with 3 prior branches will make good use of a correlating predictor, but even in this scenario, the history contains 12 bits of useless noise. This means that in a worst case, $2^{12}$ times more entries may be needed to predict a branch, greatly increasing the training period of a branch predictor along with aliasing with other branches. For a branch uncorrelated with prior branches, the entire 15 bits are noise. Procedure calls often represent breaks in program flow. Branches preceding a procedure call tend to be less correlated with branches inside the procedure call. Accordingly, an architecture that allows some branches to benefit from large histories, but eliminates or reduces the history noise in those regions where the noise is not useful is provided.

To provide better prediction of branches using global branch history register 1106, a value in global branch history register 1106 is overwritten with a start address of a first instruction in a procedure when a branch to that procedure is made. Overwriting of a value in global branch history register 1106 with an address of a start address of the procedure that is called is referred to as "presetting" herein. If the branch to the procedure was speculative and incorrectly predicted, then the value in global branch history register 1106 that was overwritten is restored to global branch history register 1106. Using a start address of a first instruction in a procedure provides a unique history for each point at which global branch history register 1106 is preset, thereby eliminating aliasing between the different preset points in the program code, and ensuring that when program execution calls the procedure again, global branch history register 1106 will be preset to the same value. Since global branch history register 1106 is used as an index into large branch history table 1108 and small branch history table 1106 to determine direction of branches, presetting global branch history register 1106 to the same value (i.e., the start address of a first instruction in a procedure) ensures that branch predictions retrieved from large branch history table 1108 and small branch history table 1106 will be local to the procedure that is called and will be more accurate.

Figure 13:
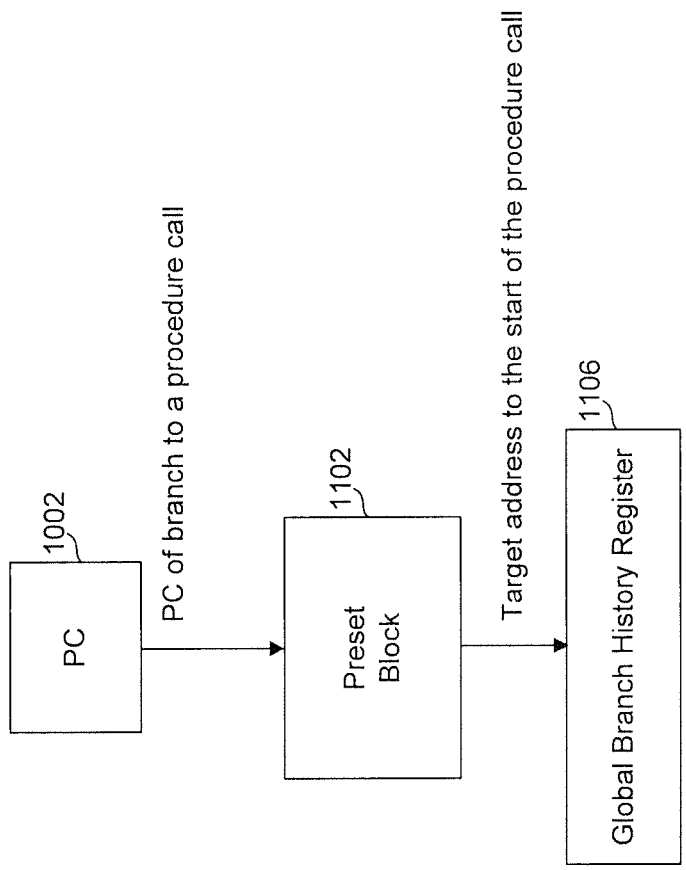
FIG. 13 illustrates presetting of the global branch history register according to an embodiment of the disclosure.

FIG. 13 illustrates presetting of global branch history register 1106 according to an embodiment of the disclosure. Preset block 1102 is coupled to program counter 1002 and global branch history register 1106. When a branch with link instruction, such as branch with link to procedure 1, causes program execution to jump to procedure 1, preset block 1102 overwrites a value in global branch history register 1106 to a start address for procedure 1. The start address for procedure 1 is the address for the first instructions in the procedure, for example, 0x014 in the program code above. The start address for the first instruction in procedure 1 may be accessed from, for example, program counter 1002. It is to be appreciated that the address for the start of a procedure may be received from sources other than program counter 1002. Whenever a subsequent jump to procedure 1 is made, the value in global branch history register 1106 will be preset to 0x014. This will not only provide better correlation for the branches within procedure 1, it will also expedite training of the large branch history table 1108 and the small branch history table 1110. Similarly, whenever procedure 2 is called, the global branch history register 1106 will be preset to the address of the first instruction in procedure 2, i.e., 0x024. Another benefit of presetting the global branch history register 1106 upon procedure calls is that it allows for a sparser large branch history table 1108 and small branch history table 1110. This results in memory savings. Furthermore, a smaller hash of a value in the global branch history register 1106 is needed when compared to conventional systems, to access entries in the large branch history table 1108 as described below with respect to FIG. 14.

Figure 14:
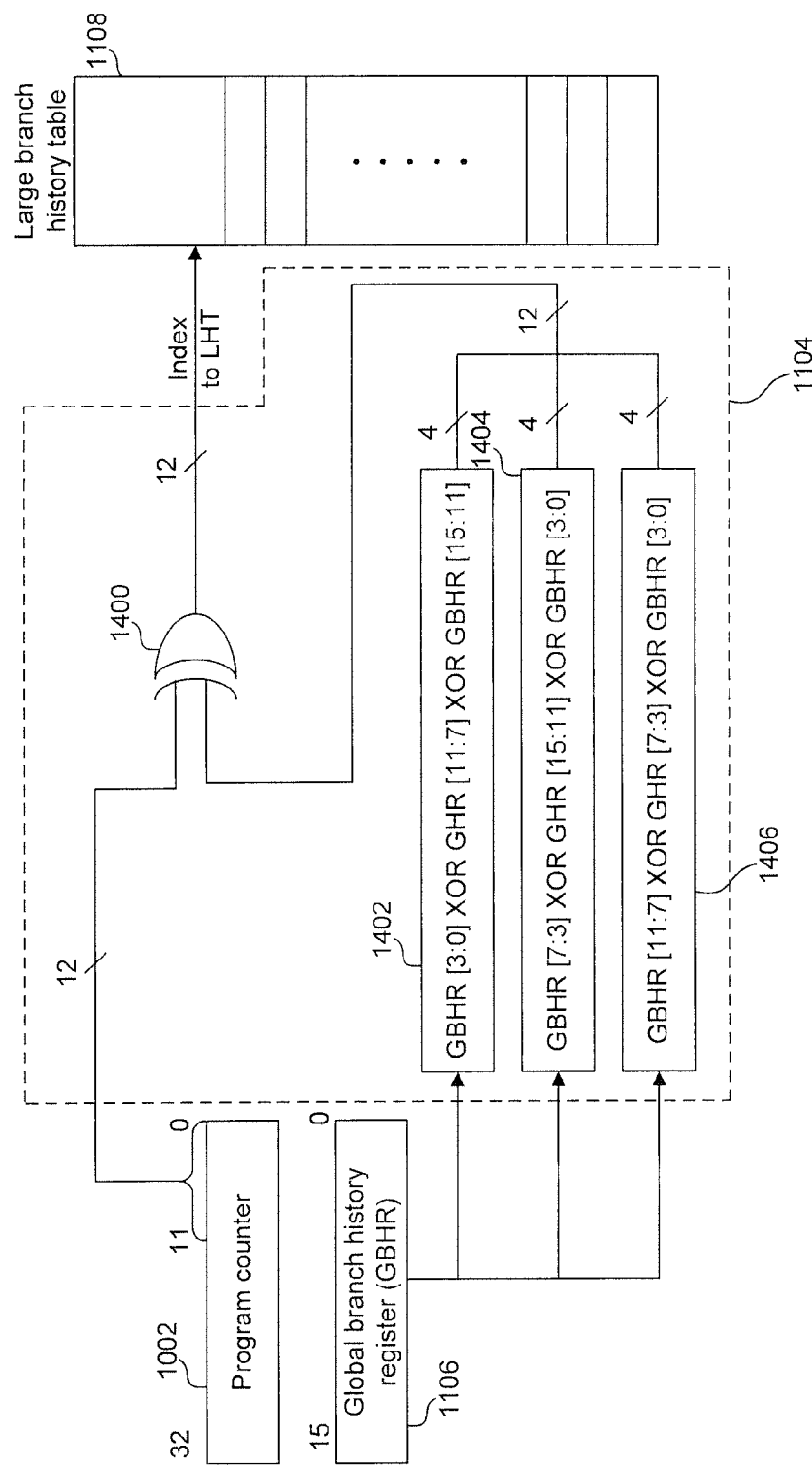
FIG. 14 illustrates an example system to provide an index to access an entry in large branch history table according to an embodiment of the disclosure.

FIG. 14 illustrates an example system to provide an index to access an entry in large branch history table 1108 according to an embodiment of the disclosure. In the example of FIG. 14, program counter 1002 and global branch history register 1106 are coupled to hash block 1104. Hash block 1104 is coupled to large branch history table 1108 and provides an index to read or write entries in large branch history table 1108. Hash block 1104 includes XOR gate 1400 and hash functions 1402, 1404 and 1406. The value in global branch history register is 15 bits wide and is hashed down to 12 bits using hash block 1104. For example, hash functions 1402, 1404, and 1406 hash a value in global branch history register 1106 from 15 bits down to 12 bits. The 12 least significant bits of program counter 1002 are XORed with the 12 bit hash of the value in global branch history register 1106 using XOR gate 1400 to produce a 12-bit index to access an entry in large branch history table 1108.

Figure 15:
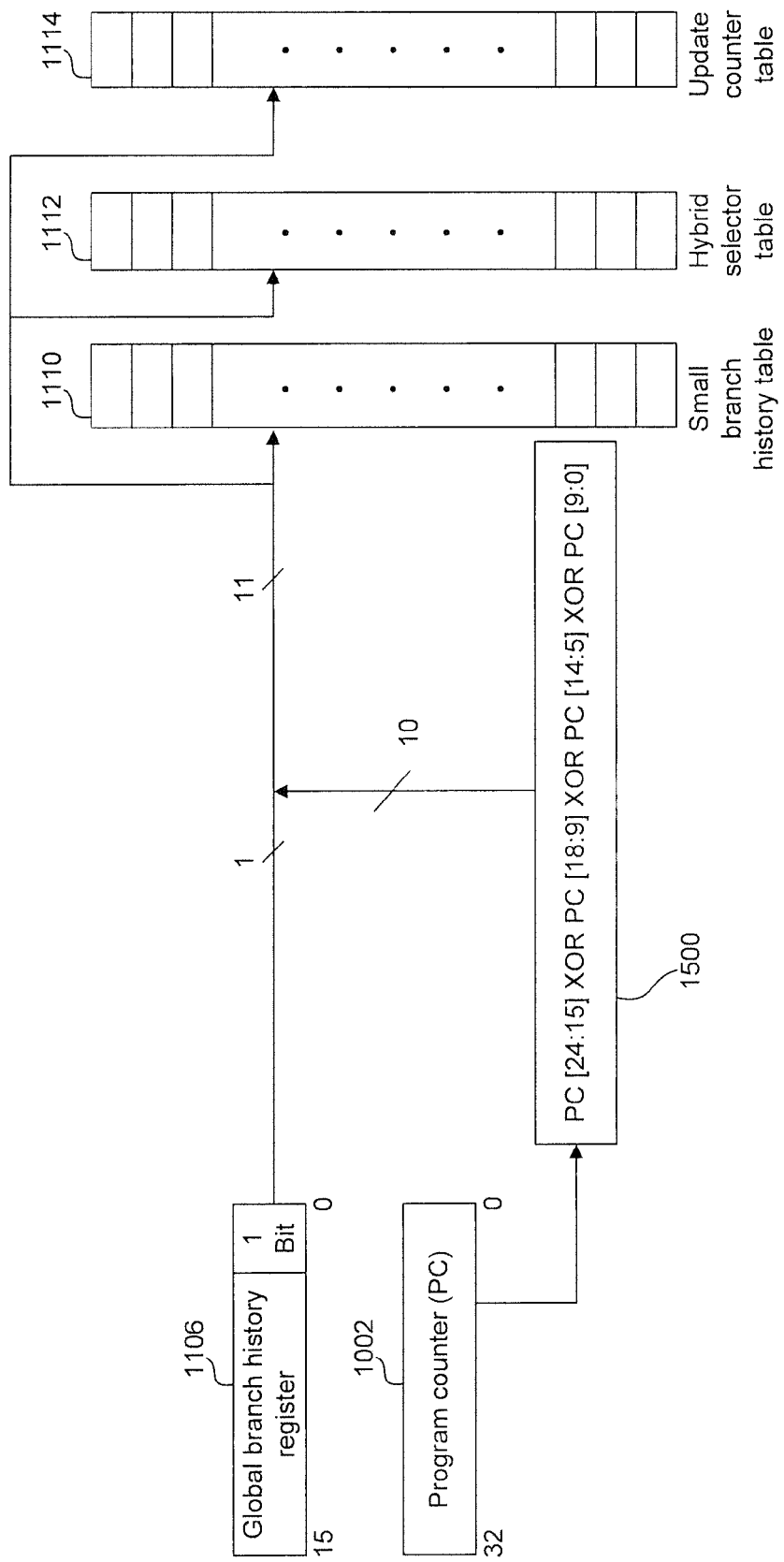
FIG. 15 illustrates a system to provide an index to access an entry in each of the small branch history table, the hybrid selector, and the update counter according to an embodiment of the disclosure.

FIG. 15 illustrates a system to provide an index to access an entry in each of small branch history table 1110, hybrid selector 1112, and update counter 1114 according to an embodiment of the disclosure. Global branch history register 1106 and program counter 1002 are coupled to hash block 1104. Hash block 1104 is coupled to small branch history table 1110, hybrid selector table 1112 and update counter table 1114. According to an embodiment of the disclosure, hash block 1104 includes XOR function 1400. XOR function 1400 hashes a 32-bit program counter value in program counter 1002 into a 10-bit value. The 10 bits generated by hash function 1400 are combined with the least significant bit of global branch history register 1106 to form a 11-bit index. This 11-bit index is used to access an entry in small branch history table 1110, hybrid selector 1112, and update counter table 1114.

Figure 16:
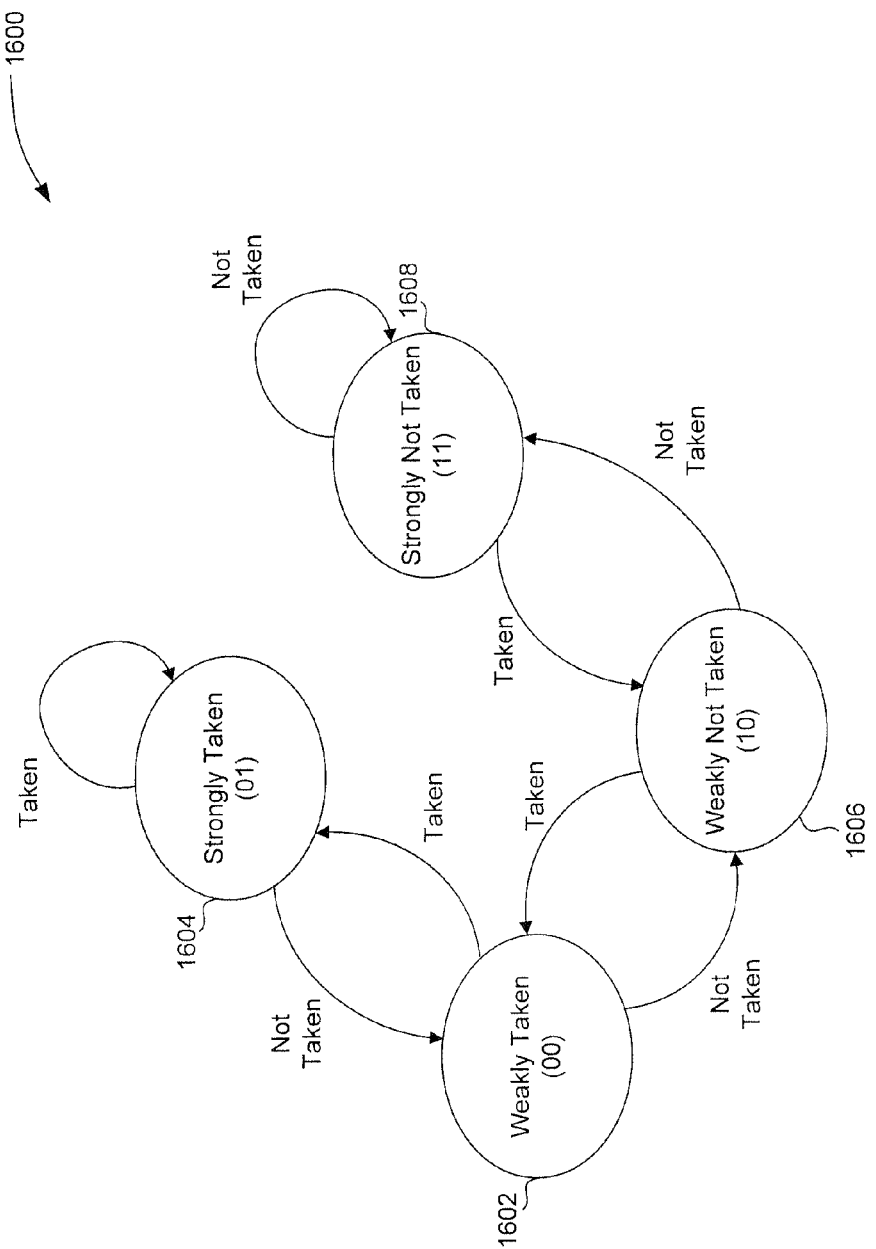
FIG. 16 illustrates an example state machine that is used to update branch prediction entries stored in the large branch history table and the small branch history table according to an embodiment of the disclosure.

FIG. 16 illustrates an example state machine that is used to update branch prediction entries stored in large branch history table 1108 and small branch history table 1110 according to an embodiment of the disclosure. During initialization, a random value may be stored in entries of large branch history table 1108 and small branch history table 310. If a branch is taken the first time it is executed, the entry corresponding to the branch is associated with a "weakly taken" state 1602 and is updated with bits 00. If the entry for a branch is currently in the weakly taken state 1602, and if a next time the branch is executed it is taken again, then the entry is associated with the "strongly taken" state 1604 and is updated with bits 01. If the current state for a branch is weakly taken state 1602, then if the branch is not taken the next time it is executed, it transitions to the "weakly not taken state" 1606 and the entry is updated with 10. If a branch is currently associated with the weakly not taken state 1606 and it is taken the next time it is executed, then the state for that branch transitions to the weakly taken state 1602 and its corresponding entry is updated with 00. If a branch is in the weakly not taken state 1606, and then it is again not taken the next time it is executed, then the state transitions to a "strongly not taken" state 1608 and the entry is updated with 11. If a branch is in a strongly not taken state 1608, and then it is taken, then it transitions to the weakly not taken state 1606 and the entry is updated with 10. If a branch is in the strongly taken state 1604 and is then taken again the next time it is executed, then it will stay in the strongly taken state 1604. If the branch is in the strongly taken state 1604, and then it is not taken the next time it is executed, then it transitions to the weakly taken state 1602 and the entry is updated with 00. If the branch is in the weakly not taken state 10 and then it is taken the next time it is executed, then it transitions to the weakly taken state 00.

Zero Overhead Loop

A "loop" is typically a sequence of one or more instructions that is repeated a specific number of times in response to a "loop instruction" or a "loop operation." The sequence of instructions that is repeated is typically referred to as a "loop body." Loop start address refers to the address of the first instruction in a loop body, i.e., the address to branch to for starting a new loop iteration. Loop end address refers to the address of the first instruction after a loop body, i.e., the address to branch to for naturally exiting the loop. Loop body can also be referred to as the instructions beginning with the loop start address and ending with the loop match address. Example pseudo code for a loop is shown below:

```
For (i>0; i<n, i++)
{
    INST 1;
    INST 2;
    INST 3;
}
```

In the example above, "For (i>0; i++)" can be referred to as the loop instruction. The loop body includes the instructions INST 1, INST 2 and INST 3. It is to be appreciated that even though only three instructions are shown in the example above, the number of instructions in a loop body is arbitrary. In the above example, "n" is the "loop count" which dictates the number of times instructions in the loop body are executed. In an example, n may be an immediate value e.g., n=5, which is encoded in the loop instruction itself and indicates that the loop body must be executed 5 times. In another example, the value of n is obtained from the general register file of the processor or from another place in an instruction pipeline. If the loop instruction and the loop body are fetched, decoded, and executed without knowing the value of "n," then the loop count n is known as a "speculative count." The loop count "n" is said to be "resolved" when its value is determined either by accessing it from the general register file or from another location in the processor. A loop instruction may be speculatively executed. When it is determined that the loop instruction was supposed to be executed or not executed, then the loop instruction is said to have been "resolved."

In conventional architectures, a compiler may synthesize and execute the following assembly language equivalent for the loop example shown above:

MOV R0, n
Loop start BREQZ R0, Loop end
SUB R0, R0, 1;
INST 1;
INST 2;
INST 3;
BR Loop Start
Loop End INST 4;
INST N;

In the example above, in order to execute the loop, the compiler first generates the move (MOV) instruction that moves the loop count n, if available, into a register, for example register R0. The compiler also generates additional instructions such as the branch equal to zero (BREQZ), the subtract (SUB), and branch (BR) instructions. The BREQZ, SUB, and BR instructions increase the size of the original loop body by three instructions.

The BREQZ R0, Loop end is inserted by the compiler at the loop start address. "Loop start" is a "label" in the example above. A label is a name or number assigned to a fixed position within code, and which may be referenced by other instructions appearing elsewhere in the code. A label has no effect other than marking a position of an instruction within code. "Loop start" or "loop start address" as used herein refers to the address of the first instruction in the loop body. In this example, the loop start address references the BREQZ instruction that is generated by the compiler. "Loop end" or "loop end address" as used herein refers the address of the first instruction after the loop body. In the example above, loop end refers to INST 4 that is the first instruction after the loop body. When the value in R0 is not equal to 0, the BREQZ instruction will exit the loop and transfer program execution to INST 4 at the loop end address. Alternatively, if the loop was speculatively executed and it is determined later in the pipeline that it should not have been executed, then program execution is again transferred to INST 4. In another example, if the original value in R0 was 0 (i.e., it was an empty loop), then program execution is again transferred to INST 4.

In addition to the MOV and BREQZ instructions, the compiler generates a subtract (SUB) instruction sub R0, R0, #1 that decrements a value in R0 by the immediate value of "1" each time the loop body is executed. Furthermore, after INST 3, the compiler also generates a branch instruction BR Loop start. BR Loop start transitions program execution back to the Loop start address. In this example of conventional assembly language code, the BREQZ instruction, the SUB instruction, and the BR instruction represent the extra instructions or "overhead" required for executing a loop. These overhead instructions are used to maintain the number of times the loop is executed, transitions to the start of the loop, as well as when the loop is to be exited.

The BREQZ, SUB, and BR instructions are overhead instructions that need to be executed every time the loop body is executed. In conventional processors, these overhead instructions add three additional cycles every time the loop body is executed. For a short loop, such as the one shown above that has only three instructions INST 1, INST 2, and INST 3, such overheard instructions almost double the number of cycles required for execution of the loop body. Accordingly, embodiments presented herein provide a zero overheard loop instruction referred to as a "ZLOOP" that significantly reduces the overheard required to executed a loop. According to an embodiment of the disclosure, example high level program code as it might be written by a programmer using the ZLOOP instruction is shown below:

ZLOOP n, Loop start
INST 1;
INST 2;
INST 3;
Loop end INST 4;
...
INST N;

According to an embodiment of the disclosure, the above high-level program code will be synthesized and executed by the processor as shown in the following assembly language equivalent:

MOV R0, n;
BREQZ R0, Loop end: SUB loopcount, R0, #1
Loop start INST 1;
 INST 2;
Loop match INST 3: BRNEZ loopcount, Loop start: SUB loopcount, loopcount, #1;
Loop end INST 4;
INST N;

The ":" in the example synthesized code means that the instructions separated by the ":" will be fetched in the same cycle. The code above only has the one-time execution overhead of MOV and the BREQZ instruction that is before the loop start address when compared to the conventional assembly language above. The BREQZ instruction is to check whether the loop is empty, i.e., R0 is equal to 0, and should not be executed. The "loopcount" in the instructions above refers to a loopcount register 1700 in FIG. 17, described further below, that stores either a loop count value (in the case of loop instructions that have an immediate value or a resolved value of the loop count) or a speculative loop count value (in the case when the loop count is unresolved).

In an illustrative embodiment, a "loop match" label or loop match address to indicate the last instruction in the loop is generated by the compiler. The loop match address refers to the address of the last instruction in the loop body i.e., INST 3. In the DE1 stage of the pipeline, upon detecting the loop match address that signifies the last instruction in the loop body, instruction decoder 106, as opposed to a program compiler, generates and enqueues the BRNEZ loopcount, Loop start instruction in a branch reservation queue 112 concurrently with enqueing INST 3 and SUB R0, R0, #1 in one or more of reservation queues 114A-D. In an alternative, INST 3 could be enqueued in load/store reservation queue 116. Since this branch instruction is generated by the instruction decoder 106 as opposed to a compiler or a programmer it is referred to herein as a "synthetic" branch. Because the synthetic BRNEZ instruction is enqueued concurrently with INST 3 along with the SUB instruction, there is no need for extra clock cycles to enqueue the generated BRNEZ instruction and SUB instruction thereby resulting in a zero overheard processing of the loop instruction. In an example, the last instruction in the loop body i.e., INST 3 in the example above, cannot be another branch instruction. While the generation of the synthetic branch instruction takes place in the DE1 stage in the examples provided herein, it is to be appreciated that the generation of the synthetic branch instruction could take place in other stages of the pipeline and by other units besides an instruction decoder.

According to a further embodiment of the disclosure, if the loop body is unresolved, the loop body will continue to be fetched and executed speculatively until it is resolved. If the number of times the loop body is to be executed (i.e., the loop count) is less than the number of fetched iterations of the loop body, then instructions associated with excessively fetched iterations of the loop body are cancelled. Cancellation of instructions entails flushing them from the pipeline and not committing any results produced by them to the architectural state of the processor. Essentially, cancellation of an instruction means that it is removed from the pipeline as if it was never fetched or executed. If the loop count is encoded in the instruction as an immediate value, then the loop count is known and does not need to be resolved. In that example, there will be no excessively fetched iterations of the loop body. Such a loop instruction that includes an immediate loop count value is referred to as a "LOOP" instruction herein. If the loop count is a signed value that is not immediate, then the instruction is referred to as a "ZLOOPS" instruction. Further details for implementing embodiments presented herein are provided below with reference to examples in FIGS. 17 and 18.

Figure 17:
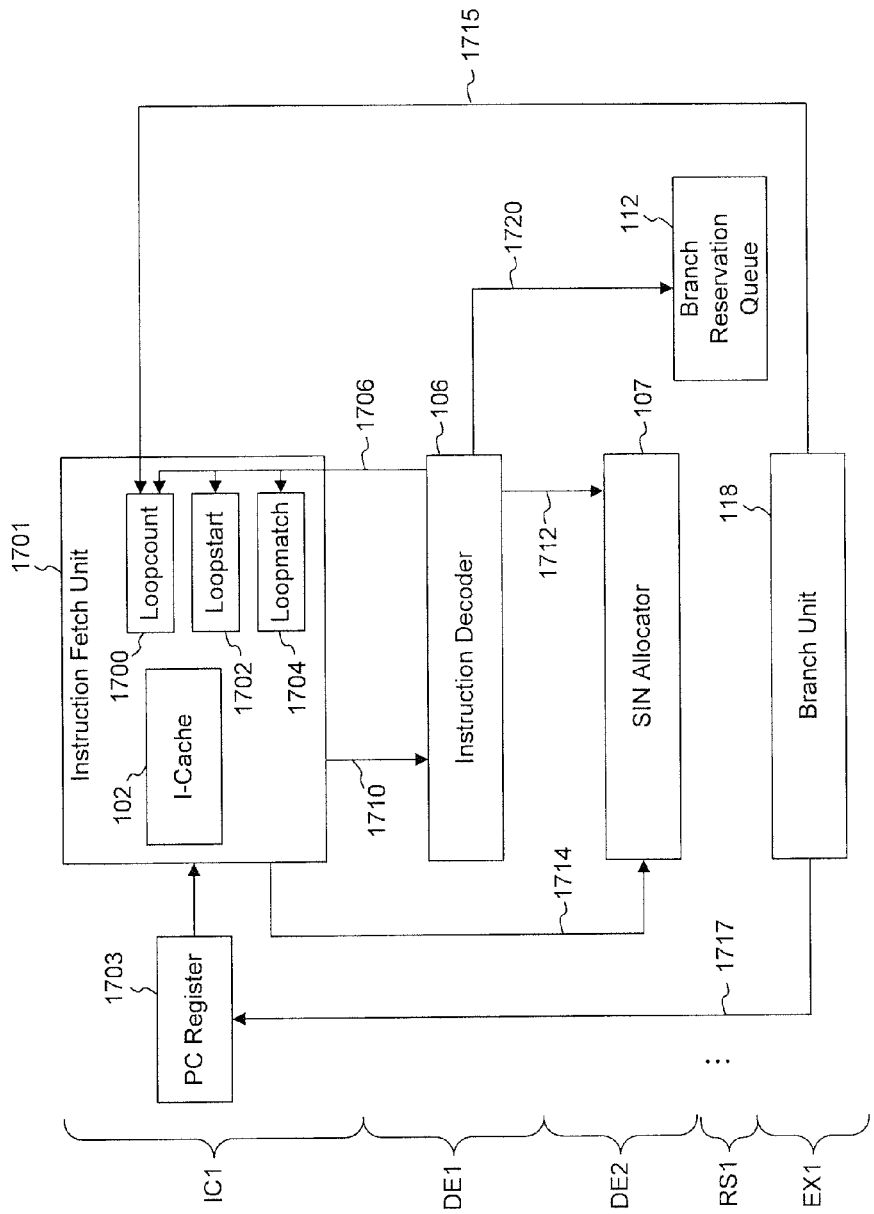
FIG. 17 illustrates a portion of an architecture for implementing a zero overhead loop according to an embodiment of the disclosure.

FIG. 17 illustrates a portion of an architecture for implementing a zero overhead loop according to an embodiment of the disclosure. FIG. 17 illustrates an instruction fetch unit 1701, instruction decoder 106, SIN allocator 107, program counter register 1703, branch reservation queue 112, and branch unit 118. Instruction fetch unit 1701 is coupled to instruction decoder 106, SIN allocator 107, program counter register 1703, and branch unit 118. In an example, program counter register 1703 stores the "program counter" alternatively referred to as a "program counter value." In an alternative embodiment, the program counter value may be received from other places in the pipeline besides program counter register 1703. Branch unit 118 is coupled to instruction decoder 106.

Instruction fetch unit 1701 includes an instruction cache (Icache) 102, a loopcount register 1700, a loopstart register 1702, and a loopmatch register 1704. The loopcount register 1700 stores either an loop count value (in the case of loop instructions that have an immediate value or a resolved value of the loop count) or a speculative loop count value (in the case when the loop count is unresolved). The speculative loop count value is replaced with the loop count when the loop count is resolved (for example, when the branch is executed in the branch unit 118 in the EX1 stage). The loopstart register 1702 stores the loop start address and the loopmatch register 1704 stores the loop match address.

FIG. 17 will now be described in conjunction with FIG. 18. The columns in FIG. 18 are the pipeline stages. IC1 is an instruction fetch stage. DE1 and DE2 are decode stages. RS1 and RS2 are reservation queue stages. EX 1 is an execution stage. It is to be appreciated that there may be one or more than one IC, DE, RS, and EX stages. The rows in FIG. 18 represent clock cycles. The nomenclature X:Y stands for pipeline stage: clock cycle.

In IC1:0 the ZLOOP instruction is fetched, for example, by instruction fetch unit 1701 from Icache 102. In DE1:1, the ZLOOP instruction is received by instruction decoder 106. Upon receiving the ZLOOP instruction, instruction decoder 106 stores the loop start address in loop start register 1702, stores the loop match address in loop match register 1704, and sets the value in loop count register 1700 to −1. The count is currently negative to indicate that the loop body is to be executed speculatively while the actual loop count is unknown. This is because the loop count may be stored in register R0 or in another place in the processor and may not be available or accessible yet. The loop count may not be resolved until the loop is resolved in branch unit 118. In an example, instruction decoder 106 sets the values in loop count register 1700, loopstart register 1702 and loopmatch register 1704 using the Zloop_detect signal 1706 in FIG. 17. In DE1:1, instruction decoder 106 also sends a SIN_generate_signal 1712 to SIN allocator 107 to generate SIN numbers for the ZLOOP instruction and instructions in the loop body. While the loop count is speculative, instruction fetch unit 1701 also asserts the loop_count_speculative signal 1714 that indicates SIN allocator 107 should continue generating SIN numbers while the loop count is speculative.

In DE2:2, the ZLOOP instruction is assigned SIN #0 since the ZLOOP instruction itself was fetched speculatively by instruction fetch unit 1701. SIN #1 is generated by SIN allocator 107 to assign to instructions in the loop body (i.e., INST 1, INST 2, and INST 3) for the first iteration of the loop body. For example, when INST 1 reaches DE2:3, SIN #1 is assigned to INST 1, when INST 2 reaches DE2:4, SIN #1 is assigned to INST 2, and when INST 3 reaches DE2:4, SIN#1 is assigned to INST 3.

When the loop match label and INST 3 reach DE1:4, instruction fetch unit 1701 detects the loop match label by comparing it to the value stored in loopmatch register 1704 and sends a loopmatch signal 1710 to instruction decoder 106 to generate the synthetic BRNEZ instruction. As described above, the loop match label refers to the last instruction in the loop body i.e., INST 3. In response to receiving the loopmatch signal 1710, instruction decoder 106 generates the synthetic branch instruction BRNEZ for enqueing into branch reservation queue 112 in the same cycle in which INST 3 is enqueued into one of reservation queues 114A-D. In an alternative, INST 3 could be enqueued in load/store reservation queue 116. In an example, instruction decoder 106 enqueues the synthetic branch instruction in branch reservation queue 112 using signal 1720. For example, if INST 3 is an arithmetic instruction it will be enqueued into one of the reservation queues 114A-D and if it is a load/store instruction it will be enqueued into one of load/store reservation queues 116, while the synthetic BRNEZ instruction will be concurrently enqueued in the branch reservation queue 112. It is to be appreciated that while in the example presented herein, the synthetic branch BRNEZ is a branch not equal to zero, in other examples, a branch equal to zero (BREQZ), a branch less than zero (BRNEZ), or branch greater than zero (BRGTZ) instruction may be generated instead.

In DE1:4, upon detecting the loop match label that refers to the last instruction in the loop body (i.e., INST 3 in this example), instruction decoder 106 again sets the Zloop detect signal 1706 to set the count value in loopcount register 1700 to −2 to indicate that a second speculative fetch and execute of the loop body is to take place.

When INST 3 along with the loop match label reaches DE2:5, in response to the loop match label, instruction decoder 106 again sends the SIN_generate_signal 1712 to SIN allocator 107 to generate SIN #2 to be assigned to instructions for the second speculative execution of the loop body.

When the ZLOOP instruction reaches EX1:5 it is executed by branch unit 118 and the loop is resolved. If the loop is empty, i.e., the actual loop count (as indicated by the actual value of R0) is determined to be 0, then the loop is exited and the program counter is redirected by branch unit 118 using redirect signal 1717 to the instruction indicated by the loop end label i.e., INST 4, and all the speculatively fetched instructions from the loop body are canceled. If the loop is not empty, i.e., R0 is greater than 0, then the value of R0 is sent via loop_count_actual signal 1715 to instruction fetch unit 1701 where it is added to the value stored in loopcount register 1700 to determine the loop count. In this example, R0 is 10, which is added to −2 and the resulting value is loop count of 8. This indicates that the loop has been executed twice and there are still 8 more iterations of the loop body to be executed.

Once the count has been resolved by determining the value for R0 in EX1:5 the loopmatch_speculative signal 1714 is de-asserted. In response to the loopmatch_speculative signal 1714 being de-asserted, SIN allocator 107 stops allocating further SIN numbers. Thus, in this example only two SIN numbers are generated. If the loop count (indicated by R0), was 0 indicating an empty loop, then all the instructions with SIN numbers #1 and #2 will be cancelled along with the speculatively fetched ZLOOP instruction with SIN number #0. If in another example, R0 was determined to be 1, then the first speculative iteration of the loop is valid and the second iteration of the loop with SIN #2 is invalidated and flushed from the pipeline.

In EX1:5, INST 3 along with the BRNEZ loopcount, Loop start instruction is executed in branch unit 118 to determine whether the branch should have been executed. For example, if loop count indicated by R0 is 0 or less than 0 or if the ZLOOP itself was wrongly speculated to be executed, then branch unit 118 may send redirect signal 1717 to redirect program counter register 1703 to the instruction indicated by the loop end address i.e., INST 4 and cancel all instructions associated with SIN #1 and #2 along with the ZLOOP instruction associated with SIN #0. If it is determined that the branch was to be executed and the loop count as indicated by R0 is not 0, then the corresponding SIN numbers are "released." Releasing SIN numbers as referred to herein means that the instructions in the loop body with released SIN numbers will be executed and their values will not be flushed from the pipeline. In this example, if R0 is 2 or more than 2, then both SIN #1 and #2 will be released. If R0 was 1, then SIN #1 will be released and SIN #2 will be invalidated thereby flushing the instructions associated with SIN #2.

CONCLUSION

It is to be appreciated that the Detailed Description section, and not the Abstract of the Disclosure, is intended to be used to interpret the claims. The Abstract of the Disclosure may set forth one or more, but not all, exemplary embodiments and thus, is not intended to limit the subjoined Claims in any way.

It will be apparent to those skilled in the relevant art(s) that various changes in form and detail can be made therein without departing from the spirit and scope of the disclosure.

What is claimed is:
1. A processor, comprising:
 a reservation queue;
 a renamer coupled to the reservation queue and configured to produce a generation number and to communicate the generation number to the reservation queue;
 a register coupled to the reservation queue and configured to store a value;
 an execution pipe coupled to the reservation queue; and
 a stunt box coupled to the execution pipe, the stunt box comprising:

a first storage, including a plurality of registers, configured to temporarily store an execution pipe result as an intermediate result;
a second storage, communicatively coupled to the first storage, configured to receive and store a plurality of storage results which includes one or more of the intermediate results;
a first arbiter, communicatively coupled to the first storage and the second storage, configured to receive a plurality of intermediate results, and the plurality of storage results and to select an output of the first arbiter to retire from the plurality of intermediate results, and the plurality of storage results;
a second arbiter, communicatively coupled to receive execution pipe results and the output from the first arbiter; and
a third storage, communicatively coupled to receive a plurality of speculative execution pipe results from the second arbiter.

2. The processor of claim 1, further comprising:
a small reset DHL Gshare branch prediction unit.

3. The processor of claim 1, further comprising:
a load/store unit configured to schedule access to memory for each of a plurality of queued load and store instructions;
wherein the load/store unit includes a resource locking circuit configured to prevent clashing memory operations from being concurrently scheduled.

4. A processor, comprising:
an instruction cache;
an instruction decoder coupled to the instruction cache;
a reservation queue coupled to the instruction decoder;
a register coupled to the reservation queue and configured to store a value;
a renamer coupled to the reservation queue and configured to produce a generation number and to communicate the generation number to the reservation queue;
a small reset DHL Gshare branch prediction unit coupled to the instruction cache and configured to generate an address and communicate the address to the instruction cache;
a plurality of execution pipes coupled to the reservation queue; and
a stunt box coupled to each execution pipe of the plurality of execution pipes, the stunt box comprising:
a first storage, including a plurality of registers, configured to temporarily store a plurality of execution pipe results as a plurality of intermediate results;
a second storage, communicatively coupled to the first storage, configured to receive and store a plurality of storage results which includes one or more of the plurality of intermediate results;
a first arbiter, communicatively coupled to the first storage and the second storage, configured to receive the plurality of intermediate results, and the plurality of storage results and to select an output of the first arbiter to retire from the plurality of intermediate results, and the plurality of storage results;
a second arbiter, communicatively coupled to receive execution pipe results and the output from the first arbiter; and
a third storage, communicatively coupled to receive a plurality of speculative execution pipe results from the second arbiter.

5. A processor, comprising:
an instruction cache;
an instruction decoder coupled to the instruction cache;
a branch prediction unit coupled to the instruction cache and configured to generate an instruction address and provide the instruction address to the instruction cache;
a register file coupled to receive a register address;
a renamer unit coupled to the instruction cache and to the instruction decoder;
a plurality of reservation queues, each reservation queue of the plurality of reservation queues coupled to the register file, the instruction decoder, and the renamer unit;
a plurality of execution pipes, each execution pipe of the plurality of execution pipes coupled to a corresponding one of the plurality of reservation queues, and configured to receive an instruction and data from the corresponding one of the plurality of reservation queues, and to execute the instruction;
a stunt box coupled to each execution pipe of the plurality of execution pipes, and configured to receive an output of each execution pipe of the plurality of execution pipes the stunt box comprising:
a first storage, including a plurality of registers, configured to temporarily store a plurality of execution pipe results as a plurality of intermediate results;
a second storage, communicatively coupled to the first storage, configured to receive and store a plurality of storage results which includes one or more of the plurality of intermediate results;
a first arbiter, communicatively coupled to the first storage and the second storage, configured to receive the plurality of intermediate results and the plurality of storage results, and to select an output of the first arbiter to retire from the plurality of intermediate results, and the plurality of storage results;
a second arbiter, communicatively coupled to receive execution pipe results and the output from the first arbiter; and
a third storage, communicatively coupled to receive a plurality of speculative execution pipe results from the second arbiter;
wherein, responsive to an output of the instruction decoder, the register file is configured to provide contents of a register specified as a source in an instruction; and responsive to the output of the instruction decoder, the renamer is configured to concurrently provide a generation number.

6. The processor of claim 5, wherein the branch prediction unit includes a small reset DHL Gshare branch predictor.

7. The processor of claim 5, wherein the instruction cache is configured to receive and store VLIW instructions.

8. The processor of claim 5, wherein an output of the stunt box is coupled to an input of each of the execution pipes of the plurality of execution pipes, and further coupled to an input of each of the reservation queues of the plurality of reservation queues.

9. The processor of claim 8, further comprising:
a load/store unit coupled the stunt box and to the register file; and
a memory coupled to the load/store unit;
wherein the load/store unit is configured to receive input from the stunt box and to receive input from the register file.

10. The processor of claim 5, wherein each reservation queue of the plurality of reservation queues is configured to store an instruction opcode, a destination register address, and a destination register generation number.

11. The processor of claim 10, wherein each reservation queue of the plurality of reservation queues is further configured to store a first source register address, a first register generation number, a first register value, a first valid bit, a second source register address, a second register generation number, a second register value, and a second valid bit.

12. The processor of claim 11, wherein the instruction decoder identifies an instruction that specifies a paired register operation.

13. The processor of claim 5, wherein the register file comprises a plurality of registers; and the renamer unit comprises a register renamer block for each of the plurality of registers.

14. The processor of claim 5, wherein the stunt box is configured to concurrently place a pair-wide output and a single-wide output onto an operand copy network.

15. The processor of claim 5, further comprising an instruction fetch unit.

16. The processor of claim 15, wherein the instruction fetch unit comprises:
- a loopcount register configured to store a either a loop count value or a speculative loop count value;
- a loopstart register configured to store a loop start address; and
- a loopmatch register configured to store a loop match address.

17. The processor of claim 15, wherein the instruction fetch unit is coupled to the instruction decoder and a SIN allocator, and configured to provide a signal to the SIN allocator indicative of a loop count value representing a speculative loop execution.

18. The processor of claim 16, wherein the instruction decoder is coupled to the loopcount register, the loopstart register and the loopmatch register.

19. The processor of claim 15, wherein the instruction fetch unit is configured to generate a loop match signal.

20. The processor of claim 19, wherein the instruction decoder is configured to receive the loop match signal from the instruction fetch unit.

* * * * *